United States Patent [19]
Yamazaki

[11] Patent Number: 5,596,682
[45] Date of Patent: Jan. 21, 1997

[54] METHOD AND APPARATUS OF AUTOMATED THEOREM PROVING FOR INFORMATION PROCESSING

[75] Inventor: Isamu Yamazaki, Kawasaki, Japan

[73] Assignee: Kabushiki Kaisha Toshiba, Kawasaki, Japan

[21] Appl. No.: 183,798

[22] Filed: Jan. 21, 1994

Related U.S. Application Data

[63] Continuation of Ser. No. 756,224, Sep. 5, 1991, abandoned, which is a continuation-in-part of Ser. No. 381,078, Jul. 18, 1989, abandoned.

[30]     Foreign Application Priority Data

Jul. 18, 1989   [JP]   Japan ................................... 63-179210

[51] Int. Cl.$^6$ ...................................................... G06F 15/18
[52] U.S. Cl. ................................................................ 395/66
[58] Field of Search .................................................. 395/66

[56]             References Cited

PUBLICATIONS

C. Lund et al., "Algebraic Methods for Interactive Proof Systems," 1990 31st Annual Symp. Foundations of Computer Science, Oct. 1990, 2–10.

R. Waldinger and M. Stickel, "Proving Properties of Rule–Based Systems," 1991 Conf. Artificial Intell. Appl., Feb. 1991, 81–88.

A. Sattar and R. Goebel, "Meta–reasoning: An Incremental Compilation Approach," 1991 7th Int'l. Conf. Data Engineering, Apr. 1991, 140–149.

Decision Analysis: A Progress Report; Kassirer; Annals of Internal Medicine; 1987; 106:275–291.

Expert Systems Technology: A Guide; Johnson; 1985; Abalus Press; Chapter 1; pp. 1–15.

*Primary Examiner*—Robert W. Downs
*Attorney, Agent, or Firm*—Foley & Lardner

[57]             ABSTRACT

A method of automated theorem proving for information processing which can be highly efficient, irrespective of the set of clauses to be dealt with. The method includes the steps of: transforming the statement and the set of knowledge into expressions in terms of elements of a module; constructing a linear equation with the elements of the module as coefficients and the elements of a ring of scalars of the module as unknowns; checking the existence of a non-negative solution to the linear equation; and determining that the statement is provable when the non-negative solution exist, and not provable otherwise.

27 Claims, 23 Drawing Sheets

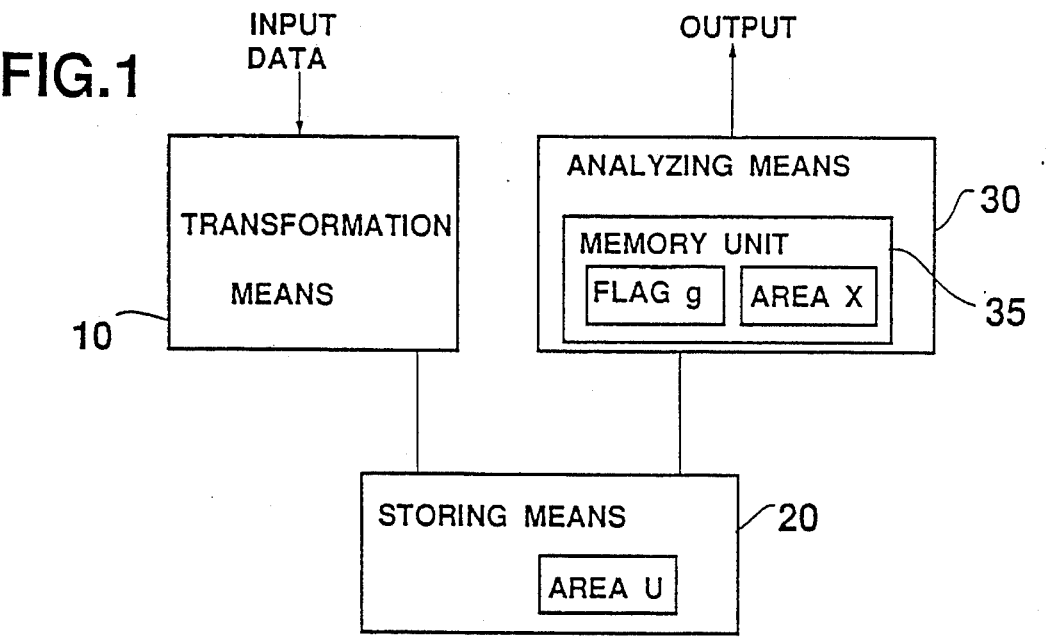
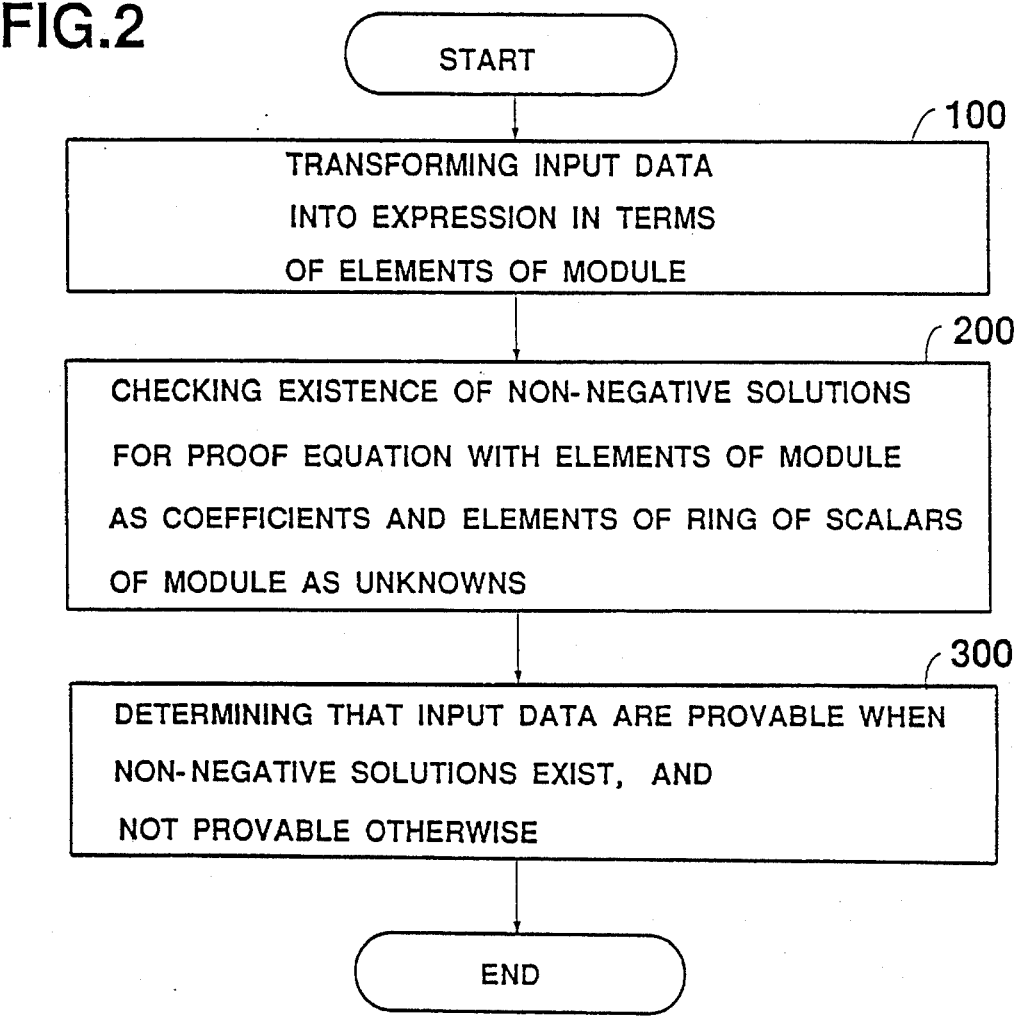

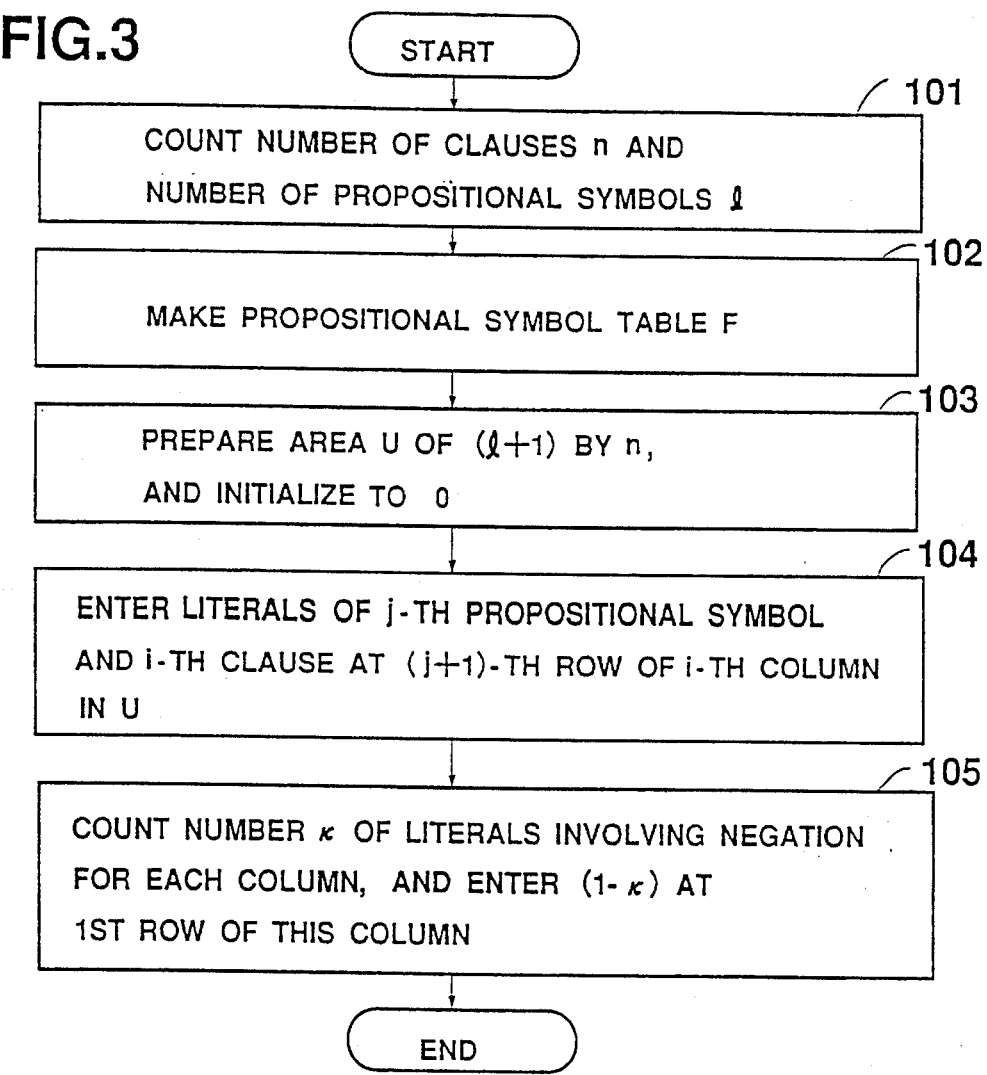

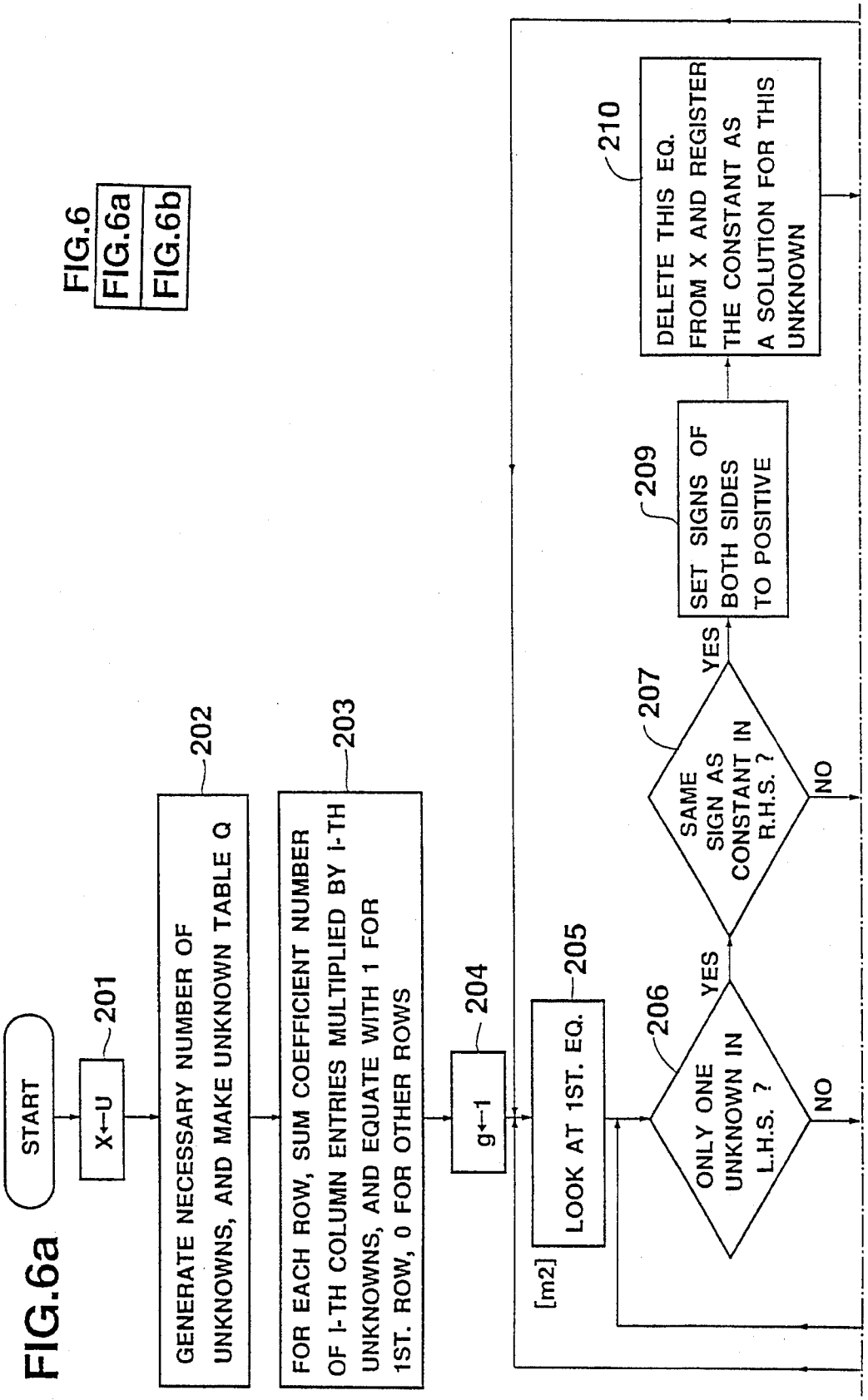

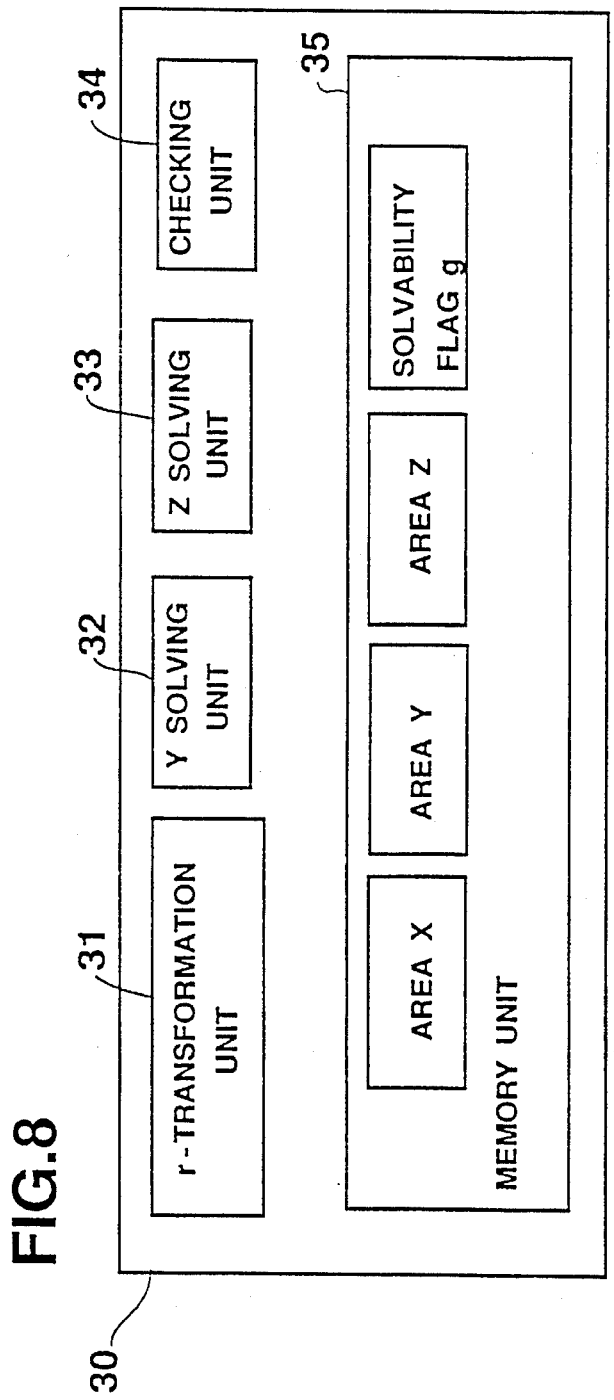

FIG.10

| NO. | PREDICATE SYMBOL | NUMBER OF ARGUMENTS | DECOMPOSITION COEFFICIENT |
|---|---|---|---|
| 1 | F | 1 | F1 |
| 2 | B | 2 | B1, B2 |

PREDICATE SYMBOL TABLE G

FIG.11

| −1 | 0 | 0 | 1 | 1 |
|---|---|---|---|---|
| −F(X) | 0 | 0 | F(a) | 0 |
| −B(yy(X),X) | −B(X,Y)+B(Y,X) | +B(Y,X)−B(Z,X) | 0 | B(b,c) |

UNKNOWN TABLE Q

| UNKNOWN | SOLUTION | MULTIPLICITY |
|---|---|---|
| @ 1 | | |
| @ 2 | | |
| @ 3 | | |
| @ 4 | | @ 4 |
| @ 5 | | @ 5 |

FIG.15

[r3] START
↓
INSERT "i*" IN FRONT OF i-TH ARGUMENT OF EACH FUNCTION — 351
↓
REPLACE "," SEPARATING ADJACENT ARGUMENTS BY "+" — 352
↓
REMOVE BRACKETS AND DISTRIBUTE PREDICATE SYMBOLS — 353
↓
END

FIG.16

VARIABLE TABLE H

| VARIABLE * UNKNOWN | NEW VARIABLE | SOLUTION | MULTIPLICITY |
|---|---|---|---|
| X*@1 | X1 | | |
| X*@2 | X2 | | |
| X*@3 | X3 | | |
| Y*@2 | Y2 | | |
| Y*@3 | Y3 | | |
| Z*@2 | Z3 | | |

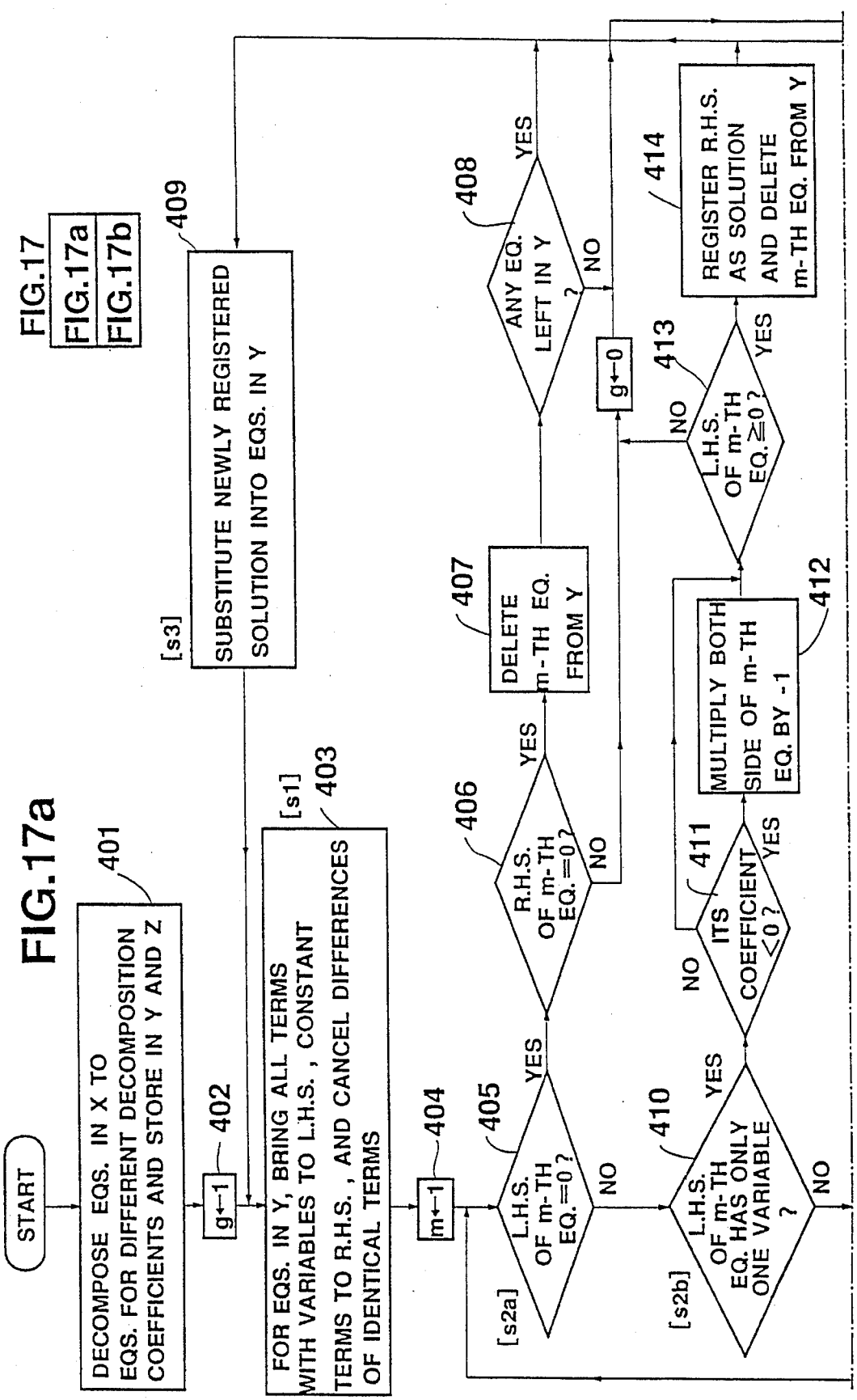

FIG.20

VARIABLE TABLE H

| VARIABLE *UNKNOWN | NEW VARIABLE | SOLUTION | MULTIPLICITY |
|---|---|---|---|
| X*@1 | X1 | a*@4 | |
| X*@2 | X2 | a*@4 | |
| X*@3 | X3 | X6+X7 | |
| Y*@2 | Y2 | c*@5 | |
| Y*@3 | Y3 | Y6+Y7 | |
| Z*@3 | Z3 | Z6+Z7 | |
| — | X4 | 0 | |
| — | X5 | 0 | |
| X*@6 | X6 | | |
| X*@7 | X7 | | |
| Y*@6 | Y6 | yy*a*@4 | |
| Y*@7 | Y7 | a*@4 | |
| Z*@6 | Z6 | b*@5 | |
| Z*@7 | Z7 | c*@5 | |

FIG.21

UNKNOWN TABLE Q

| NO. | UNKNOWN | SOLUTION | MULTIPLICITY |
|---|---|---|---|
| 1 | @1 | | |
| 2 | @2 | | |
| 3 | @3 | @6+@7 | |
| 4 | @4 | | |
| 5 | @5 | | |
| 6 | @6 | | |
| 7 | @7 | | |

FIG.22

VARIABLE TABLE H

| VARIABLE *UNKNOWN | NEW VARIABLE | SOLUTION | MULTIPLICITY |
|---|---|---|---|
| X*@1 | X1 | a*@4 | @4 |
| X*@2 | X2 | a*@4 | @4 |
| X*@3 | X3 | X6+X7 | |
| Y*@2 | Y2 | c*@5 | @5 |
| Y*@3 | Y3 | Y6+Y7 | @4+@4 |
| Z*@3 | Z3 | Z6+Z7 | @5+@5 |
| — | X4 | 0 | |
| — | X5 | 0 | |
| X*@6 | X6 | | |
| X*@7 | X7 | | |
| Y*@6 | Y6 | yy*a*@4 | @4 |
| Y*@7 | Y7 | a*@4 | @4 |
| Z*@6 | Z6 | b*@5 | @5 |
| Z*@7 | Z7 | c*@5 | @5 |

FIG.23

UNKNOWN TABLE Q

| NO. | UNKNOWN | SOLUTION | MULTIPLICITY |
|---|---|---|---|
| 1 | @1 | | @4,@5 |
| 2 | @2 | | @4,@5 |
| 3 | @3 | @6+@7 | 2@4,2@5 |
| 4 | @4 | | @4 |
| 5 | @5 | | @5 |
| 6 | @6 | | @4,@5 |
| 7 | @7 | | @4,@5 |

FIG.24
UNKNOWN TABLE Q

| NO. | UNKNOWN | SOLUTION | MULTIPLICITY |
|---|---|---|---|
| 1 | @1 |  | @4 |
| 2 | @2 |  | @4 |
| 3 | @3 | @6+ @7 | 2@4 |
| 4 | @4 |  | @4 |
| 5 | @5 | @4 | @4 |
| 6 | @6 |  | @4 |
| 7 | @7 |  | @4 |

FIG.25
VARIABLE TABLE H

| VARIABLE *UNKNOWN | NEW VARIABLE | SOLUTION | MULTIPLICITY |
|---|---|---|---|
| X*@1 | X1 | a | 1 |
| X*@2 | X2 | a | 1 |
| X*@3 | X3 | X6+X7 |  |
| Y*@2 | Y2 | c | 1 |
| Y*@3 | Y3 | Y6+Y7 | 2 |
| Z*@3 | Z3 | Z6+Z7 | 2 |
| — | X4 | 0 |  |
| — | X5 | 0 |  |
| X*@6 | X6 |  |  |
| X*@7 | X7 |  |  |
| Y*@6 | Y6 | yy*a | 1 |
| Y*@7 | Y7 | a | 1 |
| Z*@6 | Z6 | b | 1 |
| Z*@7 | Z7 | c | 1 |

FIG.26
UNKNOWN TABLE Q

| NO. | UNKNOWN | SOLUTION | MULTIPLICITY |
|---|---|---|---|
| 1 | @1 |  | 1 |
| 2 | @2 |  | 1 |
| 3 | @3 | @6+ @7 | 2 |
| 4 | @4 |  | 1 |
| 5 | @5 | @4 | 1 |
| 6 | @6 |  | 1 |
| 7 | @7 |  | 1 |

FIG. 27    CORRELATING VARIABLE TABLE P

| NO. | CORRELATING VARIABLE | EQUIVALENT CORRELATING VARIABLE |
|---|---|---|
| 1 | p | |
| 2 | q | |
| 3 | r | |
| 4 | s | |
| 5 | t | |
| 6 | u | |
| 7 | v | |
| 8 | w | |

FIG.29

VARIABLE TABLE H

| VARIABLE *UNKNOWN | NEW VARIABLE | SOLUTION | MULTIPLICITY |
|---|---|---|---|
| X*@1 | X1 | a | 1 |
| X*@2 | X2 | a | 1 |
| X*@3 | X3 | X6+X7 | |
| Y*@2 | Y2 | c | 1 |
| Y*@3 | Y3 | Y6+Y7 | 2 |
| Z*@3 | Z3 | Z6+Z7 | 2 |
| | X4 | 0 | |
| | X5 | 0 | |
| X*@6 | X6 | a | |
| X*@7 | X7 | c | |
| Y*@6 | Y6 | yy*a | 1 |
| Y*@7 | Y7 | a | 1 |
| Z*@6 | Z6 | b | 1 |
| Z*@7 | Z7 | c | 1 |

FIG.30

CORRELATING VARIABLE TABLE P

| NO. | CORRELATING VARIABLE | EQUIVALENT CORRELATING VARIABLE |
|---|---|---|
| 1 | p | s |
| 2 | q | t |
| 3 | r | |
| 4 | s | |
| 5 | t | |
| 6 | u | w |
| 7 | v | r |
| 8 | w | |

UNKNOWN TABLE Q

| NO. | UNKNOWN | SOLUTION | MULTIPLICITY |
|---|---|---|---|
| 1 | @1 | (a/X) | 1 |
| 2 | @2 | (a/X, c/Y) | 1 |
| 3 | @3 | @6+@7 | 2 |
| 4 | @4 | 1 | 1 |
| 5 | @5 | 1 | 1 |
| 6 | @6 | {a/X, yy(a)/Y, c/Z} | 1 |
| 7 | @7 | {c/X, a/Y, b/Z} | 1 |

METHOD AND APPARATUS OF AUTOMATED THEOREM PROVING FOR INFORMATION PROCESSING

This application is a continuation of application Ser. No. 07/756,224, filed Sep. 5, 1991, now abandoned, which in turn is a continuation-in-part of application Ser. No. 07/381,078, filed Jul. 18, 1989, now abandoned.

BACKGROUND OF THE INVENTION

1. Field of the Invention

The present invention generally relates to the field of information processing and artificial intelligence and, more particularly, to a method and an apparatus of automated theorem proving for solving a decision problem in which a provability of a proposition concerning relationships defined among physical objects is automatically judged on a basis of a given set of knowledge of the physical objects.

2. Description of the Background Art

Recent progress in computer science prompted the research and advance of a so called 'knowledge processing'. In this type of information processing, a language called 'Prolog' is often employed, which incorporates a mechanism for an answer to a posed question to be automatically sought on a basis of, and derived, if possible, from a prescribed set of knowledge. As can be found in detail in 'Programming in Prolog', Springer-Verlag, 1981, by W. F. Clocksin and C. S. Mellish (this will be referred hereafter as Ref. 1), in Prolog, knowledge given in the form of "clause" (a precise definition of this and other technical terms will be given below) will be regarded as an axiom and a question posed also in a form of clause will be regarded as a theorem to be proved.

Although technique of automated theorem proving is mostly utilized in the field of such an knowledge processing, it is also highly useful in the automatic validation of programs and logical circuits.

Details of the conventional technique of automated theorem proving can be found in 'Symbolic Logic and Mechanical Theorem Proving', Academic Press, 1973, by Chin-Liang Chang and Richard Char-Tung Lee (this will be referred hereafter as Ref. 2). Some basic facts and relevant conventional technique which can be found in this Ref. 2 will be described in some detail below in the DETAILED DESCRIPTION OF THE PREFERRED EMBODIMENTS in relations to the present invention. Here, without giving any definitions to terms, the problems of the prior art will be summarized.

In automated theorem proving, in essence, the problem of theorem proving is dealt with by transforming the problem into an equivalent problem of determining the unsatisfiability of the set of clauses, on a basis of the fact that "If a given theorem can be proved on a basis of the axioms (i.e., if a given theorem is true), then a set of clauses obtained by adding a clause representing a negation of the given theorem to a set of clauses of the axioms is unsatisfiable". That a set of clauses is satisfiable means there exists an "allotting (or interpretation)" of logical values under which all the clauses in the set of clauses can simultaneously be "true".

For the determination of the unsatisfiability of the set of clauses, a technique called the "resolution principle" has conventionally been used. The "resolution" is a kind of deduction in which a clause called a "resolvent" is derived from two clauses, which resolvent is guaranteed to be true when two original clauses are true. The unsatisfiability of the set of clauses is determined on a basis of the fact that "If a set of clauses is unsatisfiable, then it is possible to derive an 'empty clause' from this set of clauses by repeating the resolution" (the fact known as the "completeness of the resolution" principle).

Thus, conventionally, how fast can the empty clause be derived by repeating the resolution, or alternatively, how fast can the fact that an empty clause cannot be derived be shown, has been critical issues.

Now, for the resolution to be able to derive a resolvent, it is necessary that one and the other of the two original clauses contains one and the other member of a complementary pair (a possible) complementary pair, to be exact), respectively. Consequently, in order to derive an empty clause by the resolution, it is necessary at each step of resolution (1) to find quickly a pair of clauses for which one and the other of the pair contains one and the other member of a complementary pair, respectively, and (2) to guess one pair among all such pairs from which the empty clause can be derived faster than from the other pair.

To this end, various techniques, such as a unit resolution, a linear resolution, and lock resolution have been developed. However, these conventional techniques share in common a drawback that their efficiency (i.e., speed of deriving the empty clause) varies for different clauses to be dealt with, and that when no empty clause can be derived (i.e., when the clause is satisfiable) all the possible resolutions will be attempted, so that the efficiency is very low for such a case.

Furthermore, conventionally, the very nature of techniques using the resolution defied a realization of parallel processing to perform them at high-speed.

SUMMARY OF THE INVENTION

It is therefore an object of the present invention to provide a method and an apparatus of automated theorem proving for information processing which can be highly efficient irrespective of a set of clauses to be dealt with, even when it is a satisfiable one.

It is also an object of the present invention to provided a method and an apparatus of automated theorem proving for information processing which can easily provided high-speed parallel processing.

According to one aspect of the present invention there is provided a method of automated theorem proving for solving a decision problem in which a provability of a proposition concerning relationships defined among physical objects is automatically judged on a basis of a given set of knowledge on the physical objects, the method comprising the steps of: (a) transforming sets of clauses representing the decision problem defined in terms of a negation of the proposition and the set of knowledge into expressions in terms of elements of a module; (b) constructing a linear equation with the elements of the module as coefficients and elements of a ring of scalars of the module as unknowns; (c) checking the existence of a non-negative solution to the linear equation; (d) judging that the set of clauses is unsatisfiable when the non-negative solution exists, and satisfiable otherwise; (e) regarding the decision problem as provable when the set of clauses is judged as unsatisfiable at the step (d), and as not provable otherwise; and (f) rejecting the proposition when the decision problem is regarded as not provable at the step (e), and otherwise determining a solution of the decision problem from values of the unknowns in the linear equation by which the non-negative solution for the linear equation is obtainable.

According to another aspect of the present invention there is provided an apparatus of automated theorem proving for solving a decision problem in which a provability of a proposition concerning relationships defined among physical objects is automatically judged on a basis of a given set of knowledge on the physical objects, the apparatus comprising: (a) means for transforming sets of clauses representing the decision problem defined in terms of a negation of the proposition and the set of knowledge into expressions in terms of elements of a module; (b) means for constructing a linear equation with the elements of the module as coefficients and elements of a ring of scalars of the module as unknowns; (c) means for checking the existence of a non-negative solution to the linear equation; (d) means for judging that the set of clauses is unsatisfiable when the non-negative solution exists, and satisfiable otherwise; (e) means for regarding the decision problem as provable when the set of clauses is judged as unsatisfiable by (d), and as not provable otherwise; and (f) means for rejecting the proposition when the decision problem is regarded as not provable by (e), and otherwise determining a solution of the decision problem from values of the unknowns in the linear equation by which the non-negative solution for the linear equation is obtainable.

Other features and advantages of the present invention will become apparent from the following description taken in conjunction with the accompanying drawings.

BRIEF DESCRIPTION OF THE DRAWINGS

FIG. 1 is a schematic block diagram of a first embodiment of an apparatus for automated theorem proving according to the present invention.

FIG. 2 is a flow chart outlining the operation of the first and second embodiments of an apparatus for automated theorem proving according to the present invention.

FIG. 3 is a flow chart for the operation of a transformation means in the first embodiment.

FIG. 4 is an illustration of an example of a propositional symbol table to be utilized in the first embodiment.

FIG. 5 is an illustration of an example of a content of an area U of a storing means to be utilized in the first embodiment.

FIG. 6, including FIGS. 6a and 6b, is a flow chart for the operation of an analyzing means in the first embodiment.

FIG. 7 is an illustration of an example of an unknown table to be utilized in the first embodiment.

FIG. 8 is a schematic block diagram of an analyzing means in the second embodiment.

FIG. 10 is an illustration of an example of a predicate symbol table to be utilized in the second embodiment.

FIG. 11 is an illustration of an example of a content of an area U of a storing means to be utilized in the second embodiment.

FIG. 15 is a flow chart for another subroutine to be utilized by the r-transformation unit in the second embodiment.

FIG. 16 is an illustration of an example of a variable table to be utilized in the second embodiment.

FIG. 17, including FIGS. 17a and 17b, is a flow chart for the operation of a Y solving unit in the second embodiment.

FIG. 20 is an illustration of the variable table in the second embodiment, showing its intermediate state in a course of the operation by the analyzing means.

FIG. 21 is an illustration of the unknown table in the second embodiment, showing its intermediate state in a course of the operation by the analyzing means.

FIG. 22 is an illustration of the variable table in the second embodiment, showing its intermediate state in course of the operation by the analyzing means.

FIG. 23 is an illustration of the unknown table in the second embodiment, showing its intermediate state in a course of the operation by the analyzing means.

FIG. 24 is an illustration of the unknown table in the second embodiment, showing its intermediate state in a course of the operation by the analyzing means.

FIG. 25 is an illustration of the variable table in the second embodiment, showing its intermediate state in a course of the operation by the analyzing means.

FIG. 26 is an illustration of the unknown table in the second embodiment, showing its intermediate state in a course of the operation by the analyzing means.

FIG. 27 is an illustration of an example of a corresponding variable table to be utilized in the second embodiment.

FIG. 29 is an illustration of the variable table in the second embodiment, showing its intermediate state in a course of the operation by the analyzing means.

FIG. 30 is an illustration of the corresponding variable table in the second embodiment, showing its intermediate state in a course of the operation by the analyzing means.

FIG. 31 is a flow chart for the operation of a checking unit in the second embodiment.

DETAILED DESCRIPTION OF THE PREFERRED EMBODIMENTS

0. INTRODUCTION

Figure 6B:
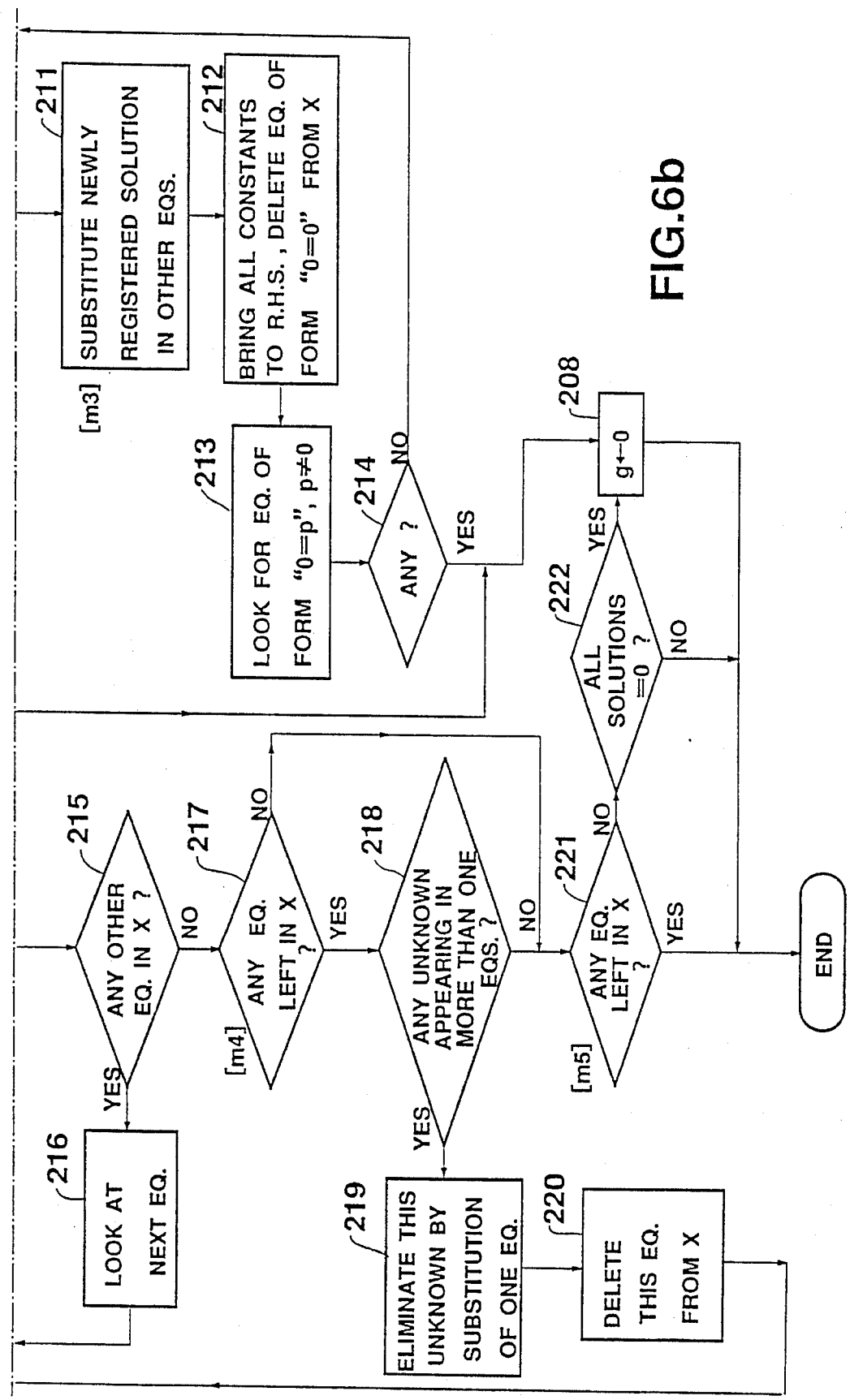

In what follows, the preferred embodiments of the present invention will be described in full detailed. However, it is indispensable for the proper appreciation of the present invention to understand the underlying theoretical concepts. Since some new theoretical notions are needed for this purpose and also in order to put things in perspective, a rather detail explanation of the theoretical concepts involved will be given below.

In short, the present invention utilizes a new theory developed by the present inventor called 'algebraic proving principle' which will replace the resolution principle which has been a cornerstone of the conventional automated theorem proving. This algebraic proving principle asserts that 'the unsatisfiability of a set of clauses and the existence of a non-negative solution to a proof equation is equivalent', which allows the transformation of the logical problem of automated theorem proving which can be expressed as the problem of the unsatisfiability of a set of clauses into the algebraic problem of determining the existence of a particular type of solution for a certain algebraic equation called a proof equation.

Thus, the theoretical explanation will be given for (1) basic notions of the predicate logic of first order and conventional resolution principle, (2) new theoretical notions involved, (3) a proof of the algebraic proving principle, and (4) examples of automated theorem proving using the algebraic theorem proving. This will be followed by a full description of the two preferred embodiments of the present invention and a discussion of the effects and advantages of the present invention. Finally, the various practical applications of the present invention will be outlined.

1. PRELIMINARIES AND CONVENTIONAL TECHNIQUES

Here, some generalities of the predicate logic of the first order are explained, and then the theorem proving using the resolution principle is described. This also serves to establish the terminologies and notations to be used.

1.1 Predicate logic of first order and clausal form

<<Expressions in the predicate logic of first order>> The predicate logic of first order deals with statements regarding properties and relationships of objects in a logical manner. For this purpose, the individual object is represented by the individual symbols (a, b, c, etc.), the properties and relationships are represented by the function symbols (f( ), g(,), etc.), and the prototypes of the statements are represented by the predicate symbols (P( ), Q(,), etc.).

The combinations of these symbols give atomic formulas which are further combined together to form formulas by means of logical connectives. The logical connectives includes ~(negation 'not'), ∨(logical sum 'or'), ∧(logical product 'and'), →(implication 'implies'), and ↔(equivalent 'if and only if').

In addition, in order to express the universal proposition 'For all object, . . . ' and the existential proposition 'There exists an object such that . . . ', the variable symbols (X, Y, etc.) representing arbitrary object, the universal quantifier ∀, and the existential quantifier ∃ are used.

EXAMPLE 1

Let F(X) represents that X is a liar, B(Y, Z) represents that Y trusts Z, and mt(U) represents the mother of U, then the statement 'a is a liar, and, b does not trust b's mother' can be expressed by the following formula $G_x$:

$$G_x = F(a) \wedge (\sim B(b, mt(b))$$

EXAMPLE 2

Similarly, the statement 'everyone trusts his mother' can be expressed by the following formula $G_y$:

$$G_y = \forall X[B(X, mt(X))]$$

<<Automated theorem proving>> The automated theorem proving in the predicate logic of first order is a problem to determine whether a certain statement holds or not when prescribed other statements are regarded as axioms or assumptions, automatically (i.e., through a well defined formal procedure), by expressing the statements in forms of formulas constructed by symbols and connectives, as explained above.

EXAMPLE 3

When the following three formulas $G_1$, $G_2$, and $G_3$ are taken to be true, to determine whether either or both of the following formulas $G_a$ and $G_b$ are true or not is a kind of theorem proving.

$$G_1 = \forall X[F(X) \to \exists Y(\sim B(Y, X))]$$

'For every liar there exists someone who does not trust him'

$$G_2 = \forall X[\forall Y[B(X, Y) \to B(Y, X)]]$$

'Everyone is trusted by those he trusts'

$$G_3 = \forall X[\exists Y[\sim B(Y, X) \to \forall Z[\sim B(Z, X)]]$$

'Anyone who is not trusted by someone is not trusted by everyone'

$$G_a = \forall X[\forall Y[B(X, Y) \to \forall Z[B(Y, Z) \to B(X, Z)]]]$$

'Everyone trusts someone who is trusted by those who he trusts'

$$G_b = \exists X[F(X)] \to \forall Z[\forall Y[\sim B(Z, Y)]]$$

'If there is one liar, every one trusts no one'

<<Terms>> Terms are defined by the following rules.

(1) Individual symbols are terms.

(2) Variable symbols are terms.

(3) Let t1, t2, . . . , tn be terms and f( . . . ) be a function with n arguments, then f(t1, t2, . . . , tn) is a term.

<<Ground Terms>> Terms consisting of function symbols and individual symbols (i.e., not containing variables) are called ground terms (also called constant terms).

<<Herbrand space>> A collection of all the ground terms is called the Herbrand space.

<<Ground formulas>> Atomic formulas with arguments consisting of ground terms (i.e., without variables) are called ground formulas.

<<Allottings(Interpretations)>> Assigning of one logical value, either true or false, to each one of the ground formulas is called allottings of logical values, or simply allottings (often also called interpretations).

<<Logical values of formulas>> The logical values, i.e., true or false, of the formulas under an allotting W are determined from the following rules:

(1) ∀X[G{X}] is true only when G{X} is true for all X which is a ground formulas, and is false otherwise.

(2) ∃X[G{X}] is true when G{X} is true for at least one X which is a ground formula, and is false otherwise.

(3) The logical values of ~G, G∨H, G∧H, G→H, and G↔H are determined from the following Table 1, according to the logical values of G and H:

TABLE 1

| G | H | ~G | G ∨ H | G ∧ H | G → H | G ⇔ H |
|---|---|----|-------|-------|-------|-------|
| T | T | F  | T     | T     | T     | T     |
| T | F | F  | T     | F     | F     | F     |
| F | T | T  | T     | F     | T     | F     |
| F | F | T  | F     | F     | T     | T     | where T stands for true, while F stands for false.

(4) When G is a ground formula, the logical value is determined according to the allotting W.

<<Logical consequences>> A formula G is said to be a logical consequence of a formula $G_0$ when G is true under every allotting under which $G_0$ is true. This can be rephrased with an expression $G_0 = G_1 \wedge G_2 \wedge \ldots \vee G_n$ as follows: G is a logical consequence of $\{G_{1\ldots n}\}$ when G is true under every allotting under which all of $\{G_{1\ldots n}\}$ are true. Thus, that G is a logical consequence of $\{G_{1\ldots n}\}$ is equivalent to that a formula $((G_1 \wedge G_2 \wedge \ldots \wedge G_n)) \rightarrow G)$ is true under any allotting.

<<Theorem 1>> If G is a logical consequence of $\{G_1, G_2, \ldots, G_n\}$, then $\{G_1, G_2, \ldots, G_n, \sim G\}$ is false under any allotting. It is necessary and sufficient for the converse to hold that there exists an allotting under which all of $\{G_1, G_2, \ldots, G_n\}$ are true. [See Ref. 2 for the proof]

<<Transformation to clausal forms>> The expressions utilized so far are not suitable for the automated theorem proving because many logically equivalent expressions can be given. For this reason, the expressions are transformed into so called clausal forms by the following steps. [See Ref. 1]

(step 1) All the implications($\rightarrow$) and the equivalences($\leftrightarrow$) are removed by means of the following equalities:

$$P \rightarrow Q = \sim P \vee Q$$

$$P \leftrightarrow Q = (\sim P \vee Q) \wedge (P \vee \sim Q)$$

For example, $G_1$ of the example 3 above becomes:

$$\forall X[\sim F(X) \vee \exists Y[\sim B(Y, X)]]$$

(step 2) All the negations(~) are brought inside brackets such that the negations appear only in front of atomic formulas (predicate symbols). For example:

$$\sim(\sim P) = P$$

$$\sim(P \vee Q) = \sim P \wedge \sim Q$$

$$\sim(P \wedge Q) = \sim P \vee \sim Q$$

$$\sim \forall X[P\{X\}] = \exists X[\sim P\{X\}]$$

$$\sim \exists X[P\{X\}] = \forall X[\sim P\{X\}]$$

(step 3) Skolemization. That is, all the existential quantifiers($\exists$) are removed by replacing variables introduced by the existential quantifiers with the Skolem constants. For example, $G_1$ of the example 3 above becomes:

$$\forall X[\sim F(X) \vee (\sim B(yy(X), X))]$$

Here, Y introduced by the existential quantifier becomes a function yy(X) of a variable X introduced by the outside universal quantifier. New designation should be given for such a function symbol which is called Skolem function.

(step 4) All the universal quantifiers($\forall$) are simply removed, with understanding that all the variables in the formulas are introduced by the universal quantifiers. For example, $G_1$ of the example 3 above becomes:

$$\sim F(X) \vee (\sim B(yy(X), X))$$

(step 5) Transformation into conjunctive normal forms. That is, all the logical products($\wedge$) are brought outside of the brackets and all the logical sums($\vee$) are brought inside the brackets by means of the following distribution laws:

$$P \vee (Q \wedge R) = (V \vee Q) \wedge (P \vee R)$$

$$(P \wedge Q) \vee R = (P \vee R) \wedge (Q \vee R)$$

(step 6) At this point, formulas are called logical formulas (or well-formed formulas often abbreviated as 'wff') which appear as logical products of smaller formulas each of which is composed as logical sums of atomic formulas and their negations (which together will be referred to as literals). These logical sums are called clauses. In other words, clauses are logical sums of literals. A set of clauses obtained by collecting of all the clauses making up the formula is called the clausal form of the formula, often denoted by S.

<<Transformation $\omega$(G) of a formula G to its clausal form>> Let $\omega$(G) denote the result of the above transformation of a formula G to its clausal form. This transformation $\omega$(G) may not be unique because of the freedom in choosing the Skolem constants. Also, $\omega$(G) may involve more than one clauses.

EXAMPLE 4

The clausal forms of the formulas in the examples 1, 2, and 3 above are as follows.

$$\omega(G_x) = \{F(a), \sim B(b, mt(b))\}$$

$$\omega(G_y) = \{G(X, mt(X))\}$$

$$\omega(G_1) = \{\sim F(X) \vee \sim B(yy(X), X)\} = \{c_1\}$$

$$\omega(G_2) = \{\sim B(X, Y) \vee B(Y, X)\} = \{c_2\}$$

$$\omega(G_3) = \{B(Y, X) \vee \sim B(Z, X)\} = \{c_3\}$$

where yy( . . . ) is a Skolem function.

<<Substitutions, target variables, introduced variables>> The replacement of a variable X by a term t is denoted by "t/X". Also, for mutually distinct variables X1, X2, . . . ,a set:{t1/X1, t2/X2, . . . } is called a substitution, denoted by $\theta$. In such a substitution $\theta$={t1/X1, t2/X2, . . . }, variables X1, X2, . . . are called target variables of the substitution $\theta$, while variables contained in t1, t2, . . . are called introduced variables of the substitution $\theta$.

<<Substitution operation>> A result of the replacement specified by a substitution $\theta$ for an arbitrary expression E is denoted by E·$\theta$. This means an expression in which those variables of E which coincide with the target variable Xi of the substitution $\theta$ are replaced by the corresponding term ti. Such an act of replacement is called a substitution operation.

<<Ground substitutions and full ground substitutions>> A substitution {t1/X1, t2/X2, . . . } for which all of t1, t2, . . . are ground terms, i.e., a substitution which has no introduced variable, is called a ground substitution. Also, for an expression (or, a set of expressions) E, a ground substitution whose target variables include all of the variables contained in E is called a full ground substitution of E. A collection of all full ground substitutions of E is denoted by $\Theta$(E).

<<Ground Instances of a clause c>> For a full ground substitution $\theta$ of a clause c, a clause denoted by c·$\theta$ which contains only ground formulas is called a ground instance of the clause c.

<<Logical values of a clause c>> If none of the ground instances $c\cdot\theta$ of the clause c is false under the allotting W, then the clause c is said to be true under the allotting W. Otherwise, the clause c is said to be false under the allotting W.

<<Logical consequences in the clause expressions>> Let $\{c_{1...n}\}$ be clausal forms of axioms. Then, a clause c is said to be a logical consequence of these axioms if the clause c is true under each allotting under which all of $c_1, c_2, \ldots, c_n$ are simultaneously true.

The relationships of the logical consequences are not conserved under the transformation $\omega$. That is, even if a formula G is a logical consequence of a formula $G_0$, a clause $\omega(G)$ may not be a logical consequence of a clause $\omega(G_0)$. This is due to the Skolemization. If G does not contain any existential quantifier $\exists$, then the relationship of the logical consequence is conserved under the transformation $\omega$.

<<Models and satisfaction>> An allotting W under which all the clauses of a formula G (or a clause c, or a set of clauses S) are true, is called a model of G (or c, or S), and W is said to satisfy G (or c, or S).

<<Satisfiability>> If a formula G (or a set of clauses S) has a model, then G (or S) is said to be satisfiable. Otherwise G (or S) is said to be unsatisfiable. In other words:

S is satisfiable $\leftrightarrow \exists W[=\theta\in\Theta(S)[\forall c\in S[c\cdot\theta$ has at least one literal which is true under W]]]

<<Theorem 2>> That n formulas: $G_1, G_2, \ldots, G_n$ as a whole is satisfiable is equivalent to that a set of clauses $\omega(G_1)\cup\omega(G_2)\cup \ldots \cup\omega(G_n)$ is satisfiable. In other words, the satisfiability is conserved under the transformation $\omega$. [See Ref. 2 for the proof]

1.2 The resolution principle and automated theorem proving using the resolution principle The resolution principle is a certain procedure of deduction for deriving a clause which is a logical consequence of a given set of clauses, proposed originally by J. A. Robinson in "A Machine Oriented Logic based on the Resolution Principle", J.ACM, Vol. 12, No. 1, pp. 23–41(1965) [this will be referred hereafter as Ref. 3]. An essence of a conventional automated theorem proving using this resolution principle will be reviewed in this subsection.

<<Products of substitutions>> A product of two substitutions $\sigma$ and $\tau$ can be defined by composition. Namely, with an arbitrary expression E, a product $\sigma\cdot\tau$ of $\sigma$ and $\tau$ is defined to satisfy an equality:

$$E\cdot(\sigma\cdot\tau)=(E\cdot\sigma)\cdot\tau$$

An actual expression of the substitution corresponding to the product $\sigma\cdot\tau$ thus defined can be obtained as follows. Namely, let $\sigma=\{t1/X1, t2/X2, \ldots, tn/Xn\}$, $\tau=\{u1/Y1, u2/Y2, \ldots, um/Ym\}$, then the product $\sigma\cdot\tau$ is a set obtained by removing from a set $\{(t1\cdot\tau)/X1, (t2\cdot\tau)/X2, \ldots, (tn\cdot\tau)/Xn, u1/Y1, u2/Y2, \ldots, um/Ym\}$ those elements $(ti\cdot\tau)/Xi$ for which $ti\cdot\tau=Xi$ and those elements $uj/Yj$ for which $Yj\in\{X1, X2, \ldots, Xn\}$.

EXAMPLE 5

$\{f(X)/Y, Z/W\}\cdot\{g(a)/X, c/Y, W/Z\}=\{f(g(a))/Y, g(a)/X, W/Z\}$

<<Unification>> Expressions P and Q are said to be unifiable if there exists a substitution $\theta$ for which $P\cdot\theta$ and $Q\cdot\theta$ coincide. Such a substitution $\theta$ is called a unifier.

<<The most general unifier>> A unifier $\theta_0$ of two expressions P and Q is called the most general unifier if for every unifier $\theta$ of P and Q there exists such a substitution $\tau$ that $\theta=\theta_0\cdot\tau$.

<<Binary resolvents>> For two clauses $c_1$ and $c_2$, let a literal $L_1$ belonging to $c_1$ and a negation $\sim L_2$ of a literal $L_2$ belonging to $c_2$ be unifiable by a unifier $\sigma$, then a clause obtained by removing $L_1\cdot\sigma$ and $L_2\cdot\sigma$ from all the literals contained in $c_1\cdot\sigma$ and $c_2\cdot\sigma$ is called a binary resolvent of $c_1$ and $c_2$.

<<Factors>> Let $\sigma$ be the most general unifier of unifiable literals $L_1, L_2, \ldots, L_i$ belonging to a clause c, then a clause obtained by removing $L_2\cdot\sigma, \ldots, L_i\cdot\sigma$ (but not $L_1\cdot\sigma$) from $c\cdot\sigma$ is called a factor of c.

<<Resolvent>> A binary resolvent of a clause $c_1$ or its factor, and a clause $c_2$ or its factor is called a resolvent of $c_1$ and $c_2$.

<<Resolution>> To resolve means to add a resolvent c of two clauses $c_1$ and $c_2$ contained in a set of clauses S to S. Such an act of addition is called a resolution, and a clause c is called a clause resolved from S.

It can be proved that if a set of clauses S is satisfiable, then a clause resolved from S is a logical consequence of S. [See Ref. 2, Ref. 3]

<<Completeness of the resolution principle>> The theorem which asserts that 'it is possible to derive an empty clause from a set of clauses S by repeated applications of the resolution if and only if S is unsatisfiable' is known as the completeness theorem of the resolution principle. An empty clause is a clause which contains no literal, denoted hereafter by $\square$. An empty clause can never be true under any allotting (i.e., it is always false).

<<Proving by the resolution principle>> The next statement follows from the theorems 1 and 2 stated above and the completeness theorem of the resolution principle: "Let $G_0$ be formulas representing axioms, G be a formula to be proved, and suppose that an empty clause cannot be derived from a clausal form $\omega(G_0)$ (i.e., $G_0$ is satisfiable), then the necessary and sufficient condition for G to be a logical consequence of $G_0$ is that an empty clause can be derived from a set of clauses $\omega(G_0)\cup\omega(\sim G)$ by resolution."

This leads to a conventional technique of proving by the resolution principle which attempts to derive an empty clause from a clausal form of formulas obtained by adding the formula for the negation of the statement to be proved to the formulas for axioms, by resolutions.

EXAMPLE 6

In order to prove $G_0$ of the example 3 above, its negation:

$$\begin{aligned}\sim G_B &= \sim\forall X[\forall Y[B(X, Y) \to \forall Z[B(Y, Z) \to B(X, Z)]] \\ &= \exists X[\exists Y[B(X, Y) \wedge \exists Z[B(Y, Z) \wedge \sim B(X, Z)]]\end{aligned}$$

is Skolemized to become $B(a, b) \wedge B(b, c) \wedge \sim B(a, c)$, from which three clauses:

$x_0=B(a, b)$ $x_1=B(b, c)$ $x_2=\sim B(a, c)$ are obtained. The attempt is then made to derive the empty clause from these three clauses $x_0, x_1$, and $x_2$ together with the three presumed clauses:

$c_1=\sim F(X) \vee \sim B(yy(X), X)$ $c_2=\sim B(X, Y) \vee \sim B(Y, X)$ $c_3 = B(Y, X) \vee \sim B(Z, X)$ The result in this case is that:

$y_0 = B(Y, c)$ from $x_1$ and $c_3$ $y_1 = \square$ from $x_2$ and $y_0$ so that $G_0$ can be proved.

2. THE CONSTRUCTION OF A MODULE WITH A LAW OF COMPOSITION CORRESPONDING TO DEDUCTION

2.1 The resolution and the law of composition

<<Possible complementary pairs>> For literal $L_1$ and $L_2$, if there exist such a unifier $\theta$ that:

$L_1 \cdot \theta = \sim L_2 \cdot \theta$ then a pair of $L_1$ and $L_2$ is called a possible complementary pair.

<<Problems of the resolution as a law of composition>> In order to perform resolution on a pair of clauses, it is necessary for the two clauses $c_1$ and $c_2$ to satisfy the condition that a pair of a literal $L_1$ belonging to $c_1$ and a literal $L_2$ belonging to ca is a possible complementary pair (this will be referred hereafter as a condition A). Because of this, the resolution is not uniformly defined on all pairs of the clauses, and is not associative, so that it is not possible to consider the resolution as a law of composition.

To circumvent this situation, a new law of composition will be introduced which is uniformly defined, associative, and gives the same results as the resolution when the condition A holds. To this end, a mechanism for arbitrarily postponing operations of removing a complementary pair in the resolution will be introduced.

2.2 The construction of a module D

<<Phrase, complementary phrase, equielementary phrase, equielementary clause>> A phrase is defined to be repeated combinations of literals, or a collection of literals in which there may be repeated occurrence of the same literals. A phrase x which contains literals of a clause c is called an equielementary phrase of the clause c, and conversely, logical sums of the literals contained in the phrase x is called an equielementary clause of the phrase x. The equielementary clause of the equielementary phrase of the clause c always coincides with the clause c itself, but the equielementary phrase of the equielementary clause of the phrase x may not necessarily coincide with the phrase x. Also, a phrase composed by literals which are the negations of all the literals of the phrase x is called a complementary phrase of x, denoted by $\sim x$.

The sum $x+y$ of two phrases x and y is defined as a simple concatenation of the two, i.e., a collection of all the literals of the two. The sum so defined is clearly commutative and associative.

EXAMPLE 7

For the following two phrases:

$x = (P(a, f(X)), Q(Y), \sim Q(b))$ $y = (\sim P(a, f(X)), \sim Q(b))$ the sum is:

$x+y = (P(a, f(X)), Q(Y), \sim Q(b), \sim P(a, f(X)), \sim Q(b))$ and the complementary phrase of x is:

$\sim x = (\sim P(a, f(X)), \sim Q(Y), Q(b))$

<<Free sentence and truth multiplicity>> An ordered pair (m, x) of an integer m and a phrase x is called a free sentence, and this integer m is called a truth multiplicity. A free addition (a♦b) of two free sentences a and b is defined by the sum of integers for the truth multiplicities and the sum of the phrases for the phrases of the free sentences. This free addition is also commutative and associative.

EXAMPLE 8

For the following two free sentences:

$a = (2, (P(a, f(X)), Q(Y), \sim Q(b)))$ $b = (-1, (\sim P(a, f(X)), \sim Q(b)))$ the free addition is:

$a \blacklozenge b = (1, (P(a, f(X)), Q(Y), \sim Q(b), \sim P(a, f(X)), \sim Q(b)))$ <<Contraction>> For a free sentence a whose phrase x contains n complementary pairs $(L_k, \sim L_k)$, the operation of subtracting a number n from the truth multiplicity of the free sentence a, and removing all the complementary pairs from the phrase x of the free sentence a is called a contraction. The contracted free sentence is denoted by a/r.

EXAMPLE 9

The free sentence $c = (a \blacklozenge b)$ of the example 8 above has one complementary pair $(P(a, f(X)), \sim P(a, f(X)))$. When contracted, the result is:

$c/r = (0, (Q(Y), \sim Q(b), \sim Q(b)))$

There is a following theorem concerning postponability of performing contraction.

<<Theorem 3>> For two free sentences a and b, $$\begin{aligned}(a/r \blacklozenge b/r)/r &= (a \blacklozenge b/r)/r \\ &= (a/r \blacklozenge b)/r \\ &= (a \blacklozenge b)/r\end{aligned}$$

Proof

Here, only the case of $(a/r \blacklozenge b/r)/r = (a \blacklozenge b)/r$ is given. Other cases can be proved in similar manners. Let $c = (a/r \blacklozenge b/r)/r$, x and y be the phrases of a and b, p and q be the number of complementary pairs in x and y, and $a_0 = (p, x)$, $b_0 = (q, y)$. Then, clearly, $a_0/r = b_0/r = (0, \emptyset)$ where $\emptyset$ denotes an empty phrase which contains no literal. Moreover, from the definition of the contraction, it follows that $a = a/r \blacklozenge a_0$, $b = b/r \blacklozenge b_0$. Consequently:

$$\begin{aligned}(a \blacklozenge b)/r &= (a/r \blacklozenge a_0 \blacklozenge b/r \blacklozenge b_0)/r \\ &= (c \blacklozenge a_0 \cdot b_0)/r \\ &= c/r\end{aligned}$$

<<Sentences and addition of sentences>> A contracted free sentence, i.e., a free sentence whose phrase contains no complementary pair, is called a sentence. A collection of all the sentences will be denoted by D. An addition a+b of two sentences a and b is defined as a contraction of a free addition. That is:

$a+b=(a \blacklozenge b)/r$

This addition is also commutative and associative. The associativity can be shown with a help of the theorem 3 above as follows:

$$
\begin{aligned}
(a+b)+c &= ((a \blacklozenge b)/r \blacklozenge c)/r \\
&= ((a \blacklozenge b) \blacklozenge c)/r \\
&= (a \blacklozenge (b \blacklozenge c))/r \\
&= (a \blacklozenge (b \blacklozenge c)/r)/r \\
&= a+(b+c)
\end{aligned}
$$

EXAMPLE 10

Both of the two free sentences a and b of the example 8 above have no complementary pair, so that they are sentences. Their addition is:

$$a+b=(0, (Q(Y), \sim Q(b), \sim Q(b)))$$

<<Zero element and inverse element; a module>> A free sentence (which is also a sentence) $(0, \emptyset)$ is a zero element with respect to both the free addition and the addition of sentences. This free sentence, therefore, is denoted by $0=(0, \emptyset)$.

As a consequence, both free sentences as a whole and sentences as a whole become monoids, with free addition and addition of sentences as the law of composition, respectively.

Moreover, for a sentence $a=(m, x)$ with the phrase x containing n literals, a sentence $(n-m, \sim x)$ can be considered as the inverse element $(-a)$ of a with respect to the addition of sentences. This can be seen from the fact that $x+(\sim x)$ is made of n complementary pairs.

Thus, sentences as a whole D is a group with the addition of sentences as the law of composition. Furthermore, since the addition of sentences is commutative, D is a module.

EXAMPLE 11

For the sentence a of the example 8 above, the inverse element $-a$ is:

$$
\begin{aligned}
-a &= (3-2, \sim x) \\
&= (1, (\sim P(a, f(X)), \sim Q(Y), Q(b)))
\end{aligned}
$$

3. RING OF SCALARS (OPERATOR DOMAIN) AND NON-NEGATIVE LINEAR COMBINATION

3.1 Ring of scalars (Operator Domain)

It is well known in algebra that every module has a ring of integers Z as a ring of scalars (operator domain). In case of the module D defined above, a ring R which is larger than that of Z can be chosen as an operator domain. Such a ring R will be defined in the following.

<<Substitutions as a monoid>> All the substitutions as a whole can be considered as a semi-group with its product as the law of composition. Since a substitution of nothing by nothing: { }=empty set, which leaves an expression unchanged, can be regarded as a unit element with respect to this product, inclusion of such a substitution of nothing by nothing makes this semi-group a monoid.

<<Ring R>> In short, a ring R can be constructed by regarding substitutions as operators on the module D, and borrowing the addition from the module D (by the law of composition through values) to extend the monoid of the substitutions into a ring. More specific definition of the ring R is as follows.

<<Definition of R>> The elements of R are defined by the following four rules [r1], [r2], [r3], and [r4].

[r1] 0, and substitutions $\sigma$ are elements of R. The operations of these on a sentence (m, x), or the right mapping $0: D \rightarrow D$ and $\sigma: D \rightarrow D$ are defined as follows:

$$(m, x) \cdot 0 = (0, \emptyset)$$

$$(m, x) \cdot \sigma = (m, x \cdot \sigma)/r$$

[r2] For two elements of R, $\alpha$ and $\beta$, and an arbitrary sentence, d, a product $(\alpha \cdot \beta)$, which is a right mapping $\alpha \cdot \beta: D \rightarrow D$, defined as follows is also an element of R.

$$d \cdot (\alpha \cdot \beta) = (d \cdot \alpha) \cdot \beta$$

[r3] For two elements of R, $\alpha$ and $\beta$, and an arbitrary sentence, d, a sum $(\alpha + \beta)$, which is a right mapping $\alpha \cdot \beta: D \rightarrow D$, defined as follows is also an element of R.

$$d \cdot (\alpha + \beta) = d \cdot \alpha + d \cdot \beta$$

r4] For an element of R, $\alpha$, and an arbitrary sentence, d, an inverse $(-\alpha)$, which is a right mapping $-\alpha: D \rightarrow D$, defined as follows is also an element of R.

$$D \cdot (-\alpha) = (-d) \cdot \alpha$$

<<Compatibility of R and the addition of sentences>> For R so defined and arbitrary sentences $a=(m, x)$, $b=(n, y)$, the following relationships hold.

$$(a+b) \cdot \alpha = a \cdot \alpha + b \cdot \alpha \qquad (A)$$

which can be derived from the following (A1), (A2), (A3), and (A4) by induction.

(A1) let $\alpha$ be one of 0, and substitutions $\sigma$, then $$
\begin{aligned}
(a+b) \cdot 0 &= (0, \phi) = a \cdot 0 + b \cdot 0 \\
(a+b) \cdot \sigma &= ((m, x) + (n, y)) \cdot \sigma \\
&= ((m, x \cdot \sigma) \blacklozenge (n, y \cdot \sigma))/r \\
&= a \cdot \sigma + b \cdot \sigma
\end{aligned}
$$

(A2) let $\alpha = \beta \cdot \gamma$ where both $\beta$ and $\gamma$ satisfy the relation (A), then $$
\begin{aligned}
(a+b) \cdot \alpha &= (a+b) \cdot (\beta \cdot \gamma) \\
&= ((a+b) \cdot \beta) \cdot \gamma \\
&= (a \cdot \beta + b \cdot \beta) \cdot \gamma \\
&= (a \cdot \beta) \cdot \gamma + (b \cdot \beta) \cdot \gamma \\
&= a \cdot (\beta \cdot \gamma) + b \cdot (\beta \cdot \gamma) \\
&= a \cdot \alpha + b \cdot \alpha
\end{aligned}
$$

(A3) let $\alpha = \beta + \gamma$ where both $\beta$ and $\gamma$ satisfy the relation (A), then $$
\begin{aligned}
(a+b) \cdot \alpha &= (a+b) \cdot (\beta + \gamma) \\
&= (a+b) \cdot \beta + (a+b) \cdot \gamma \\
&= a \cdot \beta + b \cdot \beta + a \cdot \gamma + b \cdot \gamma \\
&= a \cdot (\beta + \gamma) + b \cdot (\beta + \gamma) \\
&= a \cdot \alpha + b \cdot \alpha
\end{aligned}
$$

(A4) let $\alpha=-\beta$ where $\beta$ satisfies the relation (A), then $$\begin{aligned}
(a+b) &= (a+b)\cdot(-\beta) \\
&= (-(a+b))\cdot\beta \\
&= (-a)\cdot\beta+(-b)\cdot\beta \\
&= a\cdot(-\beta)+b\cdot(-\beta) \\
&= (a+b)\cdot\alpha
\end{aligned}$$

By the similar arguments, the following (B) also holds for an arbitrary $\alpha\epsilon R$.

$$(0,\emptyset)\cdot\alpha=(0,\emptyset) \quad (B)$$

<<R as a ring of scalars (operator domain)>> When the above relation (A) hold, R is said to be a ring of scalars (operator domain) of D. Then, an element $\alpha$ of R is called an (right) operator on the module D.

<<R as a ring>> That R is a ring can be seen from the following.

(1) 0 is a unit element for addition, and a zero element for multiplication.

(2) $-\alpha$ is an inverse element of a with respect to addition. Because, for an arbitrary sentence d:

$$\begin{aligned}
d\cdot(a+(-a)) &= d\cdot\alpha+d\cdot(-\alpha) \\
&= d\cdot\alpha+(-d)\cdot\alpha \\
&= d\cdot\alpha+(-d)\cdot\alpha \\
&= (0,\phi)\cdot\alpha \\
&= (0,\phi) \\
&= d\cdot 0
\end{aligned}$$

(3) 1, or the empty substitution, is a unit element for multiplication.

(4) As the multiplication is defined by:

$$d\cdot(\alpha\cdot\beta)=(d\cdot\alpha)\cdot\beta$$

the multiplication is associative (but not commutative).

(5) As the addition is defined through the addition of sentences by:

$$d\cdot(\alpha+\beta)=d\cdot\alpha+d\cdot\beta$$

the addition is both associative and commutative.

(6) The distributive law holds between multiplication and addition. Because, for an arbitrary sentence d:

$$\begin{aligned}
d\cdot((\alpha+\beta)\cdot\gamma) &= (d\cdot(\alpha+\beta))\cdot\gamma \\
&= (d\cdot\alpha+d\cdot\beta)\cdot\gamma \\
&= (d\cdot\alpha)\cdot\gamma+(d\cdot\beta)\cdot\gamma \\
&= d\cdot(\alpha\cdot\gamma)+d\cdot(\beta\cdot\gamma) \\
&= d\cdot(\alpha\cdot\gamma+\beta\cdot\gamma)
\end{aligned}$$

3.2 Non-negative operators and non-negative linear combinations

<<Multiplicity of operators>> For an arbitrary operator $\alpha$, an integer $\mu(\alpha)$ defined as follows is called a multiplicity of $\alpha$.

$\mu(0)=0$ $\mu(\sigma)=1$ $\mu(\alpha\cdot\beta)=\mu(\alpha)\cdot\mu(\beta)$ $\mu(\alpha+\beta)=\mu(\alpha)+\mu(\beta)$ $\beta(-\alpha)=-\mu(\alpha)$ It follows that $\mu(\beta)=\alpha$ for $\alpha\epsilon Z$ (by induction).

<<Homomorphism $\mu$>> Regarded as a mapping $\mu:R\rightarrow Z$, $\mu(\alpha)$ is an isomorphism. Thus, when an equality relation between elements $\alpha_i$ holds on R, an equality relation of the same form holds for $\mu(\alpha_i)$ on Z. Namely, let $E(X_i)$ be an expression with $X_i$ as variables, then $$E(\alpha_i)=0\rightarrow E(\mu(\alpha_i))=0$$

<<Non-negative operators>> If an operator a can be shown as an element of R by using only the rules [r1], [r2], and [r3] given above, without using the rule [r4], then $\alpha$ is said to be non-negative, which is denoted by a $\alpha\geqq 0$.

<<Linear combinations or sentences>>Let $\alpha_{1\ldots n}\epsilon R$, then the sum of sentences for a set of sentences $B=\{d_{1\ldots n}\}$ of the following form:

$$\sum_{i=1}^{n} d_i\cdot\alpha_i = d_1\cdot\alpha_1+d_2\cdot\alpha_2+\cdots+d_n\cdot\alpha_n$$

is called a linear combination of B.

<<Non-negative linear combinations>> A linear combination whose coefficients $\alpha_i$ are all non-negative is called a non-negative linear combination.

4. ADDITION OF SENTENCES AND DEDUCTION

In this section, it is shown that the law of composition for the algebraic system constructed in the previous section, i.e., the addition of sentences, can be considered as a kind of deduction.

<<Logical values of (free) sentences>> For a ground substitution $\tau$ of a phrase x, a number of literals which are in $x\cdot\tau$ and are true under an allotting W will be denoted by $T(W, x\cdot\tau)$. Then, the logical value of a sentence, or a free sentence, (m, x) is defined as follows:

$$\forall\tau\epsilon\Theta(x)[T(W, x\cdot\tau)-m\geqq 0]\leftrightarrow\text{True}$$

$$\exists\tau\epsilon\Theta(x)[T(W, x\cdot\tau)-m<0]\leftrightarrow\text{False}$$

The following lemmas immediately follow from this definition.

Lemma 1

When x is an equielemental phrase of a clause c, the logical value of a sentence (1, x) and the that of the clause c coincide under any allotting.

This is because that the logical sum of a certain collection of literals is true is equivalent to that at least one of its literals is true.

Lemma 2

When c is an equielemental clause of a phrase x, the logical value of a sentence (1, x) and the that of the clause c coincide under any allotting.

Here, let $\theta$ be a full ground substitution of x. Then, one literal in the clause c may be included more than once by the sentence x, but if $c\cdot\theta$ is true under W then at least one literal in $x\cdot\theta$ is true, whereas if $c\cdot\theta$ is not true under W then no literal in $x\cdot\theta$ is true since $x\cdot\theta$ does not contain any literal that is not contained by c, so that the lemma 2 holds.

These two lemmas imply that the truth multiplicity, which has been introduced as a mechanism for postponing the removal of complementary pairs arbitrarily, indicates a number of literals in the phrase which are necessary to be true in order for the sentence or the free sentence to be true (under an arbitrary allotting).

<<Extension of the logical consequences>> For a set of sentences B, if a sentence $a_0$ is true under any allotting under which all the sentences of B is true, then $a_0$ is said to be an extended logical consequence of B.

<<Logical values under free addition, contraction, and addition of sentences>> If two free sentences are true under an allotting W, then their free addition is also true under W. This can be shown as follows. Let two sentence be (m, x) and (n, y). Then, by assumption, $$T(W, x \cdot \sigma) - m \geq 0 \text{ and } T(W, y \cdot \sigma) - n \geq 0$$

so that, $$T(W, (x+y) \cdot \sigma) - (m-n) = T(W, x \cdot \sigma) + T(W, y \cdot \sigma) - m - n \geq 0$$

Also, the logical value of a free sentence is conserved by the contraction operation on the free sentence under any allotting. For, a complementary pair has one and only one true literal under any allotting so that by removing one complementary pair from the phrase of a free sentence and subtracting 1 from its truth multiplicity at the same time, a value of $T(W, x \cdot \tau) - m$ remains unchanged.

From these next lemma 3 follows.

Lemma 3

If two sentences are true under an allotting W, then their sum is also true under W.

<<Logical value under non-negative operator>> For an action of a non-negative operator $\alpha$ on a sentence a, the following lemma 4 holds.

Lemma 4

For a non-negative operator $\alpha$, if a sentence a is true under an allotting W, then $a \cdot \alpha$ is also true under W.

This can be shown from by induction using the following three facts, because an operator $\alpha$ is recognized to be non-negative by applying the aforementioned rules [r1], [r2], and [r3]. Throughout the following (1), (2), and (3), let a be an arbitrary sentence.

(1) The lemma is obvious when $\alpha$ is either 1 or 0. As for the case in which $\alpha$ is a substitution $\sigma$, when $\tau$ is an arbitrary full ground substitution of $a \cdot \alpha$, the substitution $\alpha \cdot \tau$ is a full ground substitution of a, and if a is true under W then $\forall \theta \in \Theta [T(W, x \cdot \theta) - m \geq 0]$. In particular $T(W, x \cdot \sigma \cdot \tau) - m \geq 0$, which implies that $a \cdot \sigma$ is true under W, so that $(a \cdot \alpha) / r$ is also true under W. Thus, the lemma also holds for this case.

(2) For the case of $\alpha = \beta \cdot \gamma$ where $\beta$ and $\gamma$ are non-negative and for which the lemma holds, since $a \cdot \beta$ is true under an allotting W under which a is true, $(a \cdot \beta) \cdot \gamma = a \cdot (\beta \cdot \gamma) = a \cdot \alpha$ is also true under W. Thus, the lemma also holds for this case.

(3) For the case of $\alpha = \beta + \gamma$ where $\beta$ and $\gamma$ are non-negative and for which the lemma holds, since $a \cdot \beta$ and $a \cdot \gamma$ are true under an allotting W under which a is true, $a \cdot \alpha = a \cdot \beta + a \cdot \gamma$ is also true under W from the lemma 3 above. Thus, the lemma also holds for this case.

<<Logical value of non-negative linear combination>> The next lemma 5 follows from the lemmas 3 and 4.

Lemma 5

If all the sentences of a set of sentences B are true under an allotting W, then a non-negative linear combination of B is also true under W.

In other words, the non-negative linear combination of B is an extended logical consequence of B.

5. ALGEBRAIC DEDUCTION PRINCIPLE AND ALGEBRAIC PROVING PRINCIPLE

<<Theorem 4 (The algebraic deduction principle)>> Let $S = \{c_1, c_2, \ldots, c_n\}$ be a set of clauses, each of which contains no complementary pair, and $x_i$ be an equielemental phrase of $c_i$. If the truth multiplicity of the non-negative linear combination:

$$a = \sum_{i=1}^{n} (1, x_i) \cdot \alpha_i$$

is equal to (or greater than) 1, then an equielemental clause c of a phrase a is a logical consequence of S.

[Proof] Let $$a = \sum_{i=1}^{n} (1, x_i) \cdot \alpha_i = (m, x)$$

and assume S is satisfied by an allotting W. Then, a sentence $(1, x_i)$ is true under W from Lemma 1. Now, by assumption m is not less than 1 and $\alpha_i$ is non-negative, so that all of $\alpha_i$ cannot be zero. It follows that a which is a non-negative linear combination of the sentence $(1, x_i)$ is true under W. On the other hand, that a is true under W by definition means that for an arbitrary full ground substitution $\tau$ no less than m literals of $x \cdot \tau$ are true under W, so that if $m \geq 1$, then for an equielemental clause c of x, $c \cdot \tau$ is true under W. Since $\tau$ is an arbitrary full ground substitution, this implies that c is true under any allotting under which S is true. Thus, c is a logical consequence of S. ∎

<<Horn conditions>> The following conditions, collectively called the Horn conditions, on a set of clauses S are actually equivalent to each other.

[Normal Horn condition] Every clause in S has at most one positive literal.

[Invert Horn condition] Every clause in S has at most one negative literal.

[Latent Horn condition] There exists an allotting under which every clause in S has at most one true literal.

The equivalence can be seen as follows. If S satisfies the invert Horn condition, then by re-defining every predicate symbol $A_j$ as $B_j = \neg A_j$, S in terms of $B_j$ satisfies the normal Horn condition. Also, if S satisfies the latent Horn condition, then by re-defining every predicate symbol $A_j$ which is false under the allotting as $B_j = \neg A_j$ and remaining predicate symbols Aj as Bj=Aj, S in terms of $B_j$ satisfies the normal Horn condition.

<<Lemma 6>> If sentences a, b and clauses c, d, e satisfy the following five conditions:

(1) each of a and b contains at most one negative literal, (2) the truth multiplicities of both a and b are 1, (3) c and d are equielemental clauses of phrases of a and b, respectively, (4) none of c, d, and e contains a complementary pair, (5) c is a resolvent of d and e, then there exists a non-negative linear combination of a and b:

$$(6) \quad a_1 = a \cdot \beta + b \cdot \gamma \quad (\beta, \gamma \geq 0)$$

which satisfies the following three conditions:

(7) $a_1$ contains at most one negative literal, (8) the truth multiplicity of $a_1$ is 1, (9) c is an equielemental clause of a phrase of $a_1$.

Proof

Let θ be the unifier for the resolution of c from d and e in the condition (5) (here, if c is the binary resolvent from one or both of the factors d·σ and e·τ of d and e, respectively, such substitutions σ and τ for the factorizations are considered to be included in θ). The conditions (1) and (3) imply that each of d and e also contains at most one negative literal. Thus, a negative literal of a complementary pair to be removed at the resolution of c is either (A) a negative literal ~Lb in e·θ, or (B) a negative literal ~La in d·θ. By the symmetry between cases (A) and (B), an argument for (A) suffices for both.

Thus, concentrating on the case (A), in this case the positive literal of the complementary pair to be removed is Lb in d·θ. By the condition (3), a may contain more than one Lb. So, let the number of such Lb contained in a be nb, and consider a free sentence: $a_0 = a \cdot \theta \blacklozenge (b \cdot \theta) \cdot nb$. Clearly, the truth multiplicity of ae is 1+nb. Now, $a_0$ contains nb positive literals Lb coming from a·θ and nb negative literals ~Lb coming from b·(θ·nb). In other words, $a_0$ contains nb complementary pairs (Lb, ~Lb). Then, the following construction:

$$a_1 = a_0/r$$
$$= a \cdot \theta + b \cdot (\theta \cdot nb)$$
$$= a \cdot \beta + b \cdot \gamma \text{ where } \beta = \theta, \gamma = \theta \cdot nb$$

satisfies the condition (8) because the truth multiplicity of $a_1$ is (1+nb)−nb=1.

Meanwhile, all the literals in a·θ except for nb positive literals Lb remain in $a_1$, whereas nb times of all the literals in b·θ except negative literals ~Lb appear in $a_1$. On the other hand, the literals contained in c are those contained in d·θ and e·θ which are not removed as complementary pairs at the resolution of c. Thus, the condition (9) holds.

Finally, if at contains any negative literal, it could only be the one negative literal ~La which is originally contained in a·θ, so that the condition (7) holds.

Since $a_1$ constructed above has a correct form of non-negative linear combination of (6), the lemma holds for the case (A). The case (B) can be proved similarly.

<<Theorem 5 (The algebraic proving principle)>> For a set of complementary-pair-free clauses $S=\{c_1, c_2, \ldots, c_n\}$ which is satisfying the Horn conditions, the necessary and sufficient condition for S to be unsatisfiable is that there exist non-negative solution $\alpha_i$ for a linear equation (the proof equation):

$$\sum_{i=1}^{n} (1, x_i) \cdot \alpha_i = (1, \phi)$$

where $x_i$ is an equielemental phrase of $c_i$.

Note that 'the existence of non-negative solution to the proof equation implies that tile set of clauses S is unsatisfiable' follows directly from the algebraic resolution principle (Theorem 4), without S being satisfying the Horn condition. However, the converse cannot be proved unless S is satisfying the Horn condition.

Proof (Sufficiency) If the proof equation has non-negative solution, then all of $\alpha_i$ cannot be zero. Therefore, these $\alpha_i$ can be identified with $\alpha_i$ in the non-negative linear combination of Theorem 4. It then follows from the Theorem 4 that S is unsatisfiable.

(necessity) The following argument for the invert Horn condition suffices, as the Horn conditions are transformable from one to another.

First, for $c_i$ and its equielemental phrase $x_i$, let $d_i=(1, x_i)$, where $1 \leq i \leq n$. Then, the following five conditions holds for every such $c_i$ and $d_i$:

(1) $d_i$ is a non-negative linear combination of $d_1, d_2, \ldots, d_n$, (2) $d_i$ contains at most one negative literal, (3) the truth multiplicity of $d_i$ is 1, (4) $c_i$ is an equielemental clause of a phrase of $d_i$, (5) $c_i$ contains no complementary pair.

Now, assume S is unsatisfiable. Then, by the completeness of the resolution principle, an empty clause can be derived from this set of clauses by resolutions. Let $C_{n+1}, C_{n+2}, \ldots, C_m$ (=☐) be those clauses which are sequentially added to this set of clauses at each resolution, then such $c_j (n+1 \leq j \leq m)$ can be assumed to contain no complementary pair. Now, for each such $c_j$, it can be shown by induction that there exists a corresponding $d_j$ satisfying the conditions (1) to (4) as follows. Consider some j where $n \leq j < m$. Now, assume there exists $d_i$ for which the conditions (1) to (4) holds with $n \leq i \leq j$. Then, since $c_{j+1}$ is a resolvent from two clauses $c_k$ and $c_l$ of a set of clauses $\{c_1, c_2, \ldots, c_j\}$, and these $c_{j+1}, C_k, C_l,$ and $d_k, d_l$ satisfy the conditions of Lemma 6, so that by Lemma 6 there exists a non-negative linear combination $d_{j+1}$ of $d_k$ and $d_l$ of the form:

$$d_{j+1} = d_k \cdot \beta_k \blacklozenge d_l \cdot \beta_l$$

where $\beta_k, \beta_l \in R$ are non-negative which satisfies the conditions (2) to (4). Furthermore, since $d_k$ and $d_l$ are some of $d_i$ ($1 \leq i \leq j$) they are non-negative linear combinations of $d_1, d_2, \ldots, d_n$ by the condition (1), $d_{j+1}$ which is a non-negative linear combination of these is also a non-negative linear combinations of $d_1, d_2, \ldots, d_n$, so that this $d_{j+1}$ also satisfies the condition (1).

In particular, $d_m$ corresponding to $c_m$ (=☐) is also a non-negative linear combination of $d_1, d_2, \ldots, d_n$ so that for a suitable $\alpha_i \in R$, it can be written as:

$$d_m = \sum_{i=1}^{n} (1, x_i) \cdot \alpha_i$$

By the conditions (3) and (4), dm must be a sentence with the truth multiplicity 1, and the equielemental clause of its phrase is an empty clause. Since $(1, \emptyset)$ is the only such sentence, it follows that $$(1, \phi) = \sum_{i=1}^{n} (1, x_i) \cdot \alpha_i$$

so that the proof equation has non-negative solution $\alpha_i \in R$. ∎

This theorem reduces the problem of theorem proving in the predicate logic of first order, or equivalent problem of satisfiability of a set of clauses, to the algebraic problem of the existence of non-negative solution $\alpha_i \in R$ for the proof equation. This theorem is at the heart of the present invention.

6. DIRECT SUM DECOMPOSITION OF A MODULE D AND SIMULTANEOUS FORM OF THE PROOF EQUATION

In this section, the proof equation of Theorem 5 in the previous section is shown to be expressible in the simultaneous form, i.e., as a system of simultaneous equations.

<<Submodule $D_k$>> Let l be the number of predicate symbols. Now, if each of two sentences $d_1$ and $d_2$ satisfies the following two conditions:

(a) it contains at most only the k-th predicate symbols, (b) a number of negative literals minus the truth multiplicity is zero, then, the sum of the two also satisfies these two conditions. For, by the contraction associated with the addition the same number as the number of negative literals removed will be subtracted from the truth multiplicity. Also, the zero element $(0, \emptyset)$ satisfies these two conditions. Therefore, the collection of those sentences satisfying these two conditions, denoted by $D_k$, is a submodule of the module D. Furthermore, for $d \in D_k$ and $\alpha \in R$, $d \cdot \alpha \in D_k$ so that $D_k$ is a right-R submodule.

<<Submodule $D_0$>> Next, let $D_0$ denote the collection of sentences $(m, \emptyset)$, which satisfy the condition:

(c) it is an empty sentence,

Then $D_0$ contains the zero element, and is closed under addition (which in this case is just a sum of truth multiplicities). Therefore $D_0$ is also a submodule of the module D.

Furthermore, for $\alpha \in R$, $(m, \emptyset) \cdot \alpha = (m \cdot \mu(\alpha), \emptyset) \in D_0$ so that $D_0$ is also a right-R submodule.

<<Additive independence of $D_{0 \ldots l}$>> With the submodules $D_0$ and $D_k$ so far introduced, which is collectively denoted by $D_{0 \ldots l}$, it is obvious that, $$D_i \cap (\text{direct sum of } D_j \ (j \neq i)) = \{(0, \emptyset)\}$$

Such a set of $D_k$ is said to be additively independent.

<<Decomposition of a sentence and its uniqueness>> An arbitrary sentence d can be decomposed into at most l+1 sentences $d_k \in D_k$, which is denoted as:

$$d = \sum_{k=0}^{l} d_k$$

where $d_k$ is called a k-th component of d.

This decomposition is unique from the additive independence of $D_k$.

EXAMPLE 12

$$\begin{aligned} d &= (3, (P(f(a), X), \sim P(Y, b), Q(b), Q(b))) \\ &= (2, \phi) + (1, (P(f(a), X), \sim P(Y, b))) + \\ &\quad (0, (Q(b), Q(b))) \end{aligned}$$

<<Direct sum decomposition of a module D>> As shown above, since an arbitrary element of D can be decomposed as a unique sum of elements of $D_k$, it follows that $D_{0 \ldots l}$ is a direct sum decomposition of D.

<<Simultaneous form of the proof equation>> From the uniqueness of the k-th component, it follows that if the proof equation has solution then the k-th components of the both sides of the equation are equal. Namely, let $\{c_{1 \ldots n}\}$ be a set of clauses, $x_{1 \ldots n}$ be their equielemental phrases, $d_{ki}$ be the k-th component of $(1, x_i)$, and $e_k$ be the k-th component of $(1, \emptyset)$, then the proof equation can be written as:

$$\sum_{i=1}^{n} d_{ki} \cdot \alpha_i = e_k,$$
$$(0 \leq k \leq l)$$

which is called the simultaneous form of the proof equation.

<<Generators of $D_K$>> Let $P_k$ be the k-th predicate symbol, and $(X1, X2, \ldots)$ be a set of variable symbols, then, $$b_k = (0, (P_k(X1, X2, \ldots))), \ (0 \leq k \leq l)$$

is a generator of $D_k$ ($k \neq 0$). In other words, an arbitrary $d_k \in D_k$ can be written, in terms of a suitable $\alpha_k \in R$, as $$d_k = b_k \cdot \alpha_k$$

Conversely, $b_k \cdot \alpha \in D_k$ for an arbitrary $\alpha \in R$.

<<Generator of $D_0$>> Also, clearly, $$b_0 = (1, \emptyset)$$

is a generator of $D_0$. In other words, an arbitrary $d_0 \in D_0$ can be written, in terms of a suitable $\alpha_0 \in R$, as $$d_0 = b_0 \cdot \alpha_0 \ (= b_0 \cdot \mu(\alpha_0) = (\mu(\alpha_0), \emptyset))$$

Conversely, $b_0 \cdot \alpha \in D_0$ for an arbitrary $\alpha \in R$.

<<K-th coefficient of a sentence>> Therefore, the k-th component of an arbitrary sentence d can be written as $b_k \cdot \alpha_k$, or:

$$d = \sum_{k=0}^{l} d_k = \sum_{k=0}^{l} b_k \cdot \alpha_k$$

where $\alpha_k$ is called the k-th coefficient of d.

7. A CASE OF PROPOSITIONAL LOGIC

Up to this point, the explanation has been given for the predicate logic of first order. A case of the propositional logic will be briefly treated in this section.

In the propositional logic, what corresponding to the predicate symbols in the predicate logic of first order are atomic propositional symbols, which can be considered as predicates without argument. Thus, in the propositional logic, a statements are expressed as such atomic propositional symbols connected by logical connectives, where variable symbols, universal quantifier, and existential quantifier do not appear. Therefore, there is no Skolemization in the transformation $\omega$, nor substitutions for variables.

In a case of the propositional logic, a module D can still be constructed in exactly the same manner as the predicate logic of first order. Since there is no substitution in the propositional logic, a ring of scalars R of the module D is nothing but a ring of integers Z. Furthermore, the generators $b_{0 \ldots l}$ also serve as the bases. That is, $b_{0 \ldots l}$ are linearly independent, so that the k-th component of an arbitrary element a of D is uniquely determined. As a consequence, the simultaneous form of the proof equation reduces to simultaneous equations on Z among its coefficients. Thus, in the propositional logic, the problem of the existence of non-negative solution to the proof equation is just the problem of the existence of non-negative solution to the system of simultaneous equations on Z, and this fact renders an enormous simplification for the case of propositional logic.

8. EXAMPLES AND METHODS OF THEOREM PROVING BY ALGEBRAIC PROVING PRINCIPLE AND REMARKS.

In this section, two examples of theorem proving by the algebraic proving principle developed so far will be described, which also serve to demonstrate certain methods of solving the proof equation. Some remarks concerning practical implementation of the methods are made at the end.

8.1 A case of propositional logic

Here, an example of the proving problem is that given the next two statements as axioms:

1: "If it is a holiday and Taro has money, then Taro goes to shopping"

2: "If it is a work day, then Taro goes to work"

to determine whether the following statement is true:

3: "Taro does not go to shopping on a work day"

First, in order to translate these statements into the expressions of the propositional logic, the following atomic propositions are defined:

P="It is a work day"
Q="Taro has money"
R="Taro goes to shopping"
T="Taro goes to the office" in terms of these, the statements 1, 2, and 3 can be written as:
1: $\sim P \wedge Q \rightarrow R = G_1$
2: $P \rightarrow T = G_2$
3: $P \rightarrow \sim R = G_3$ Next, $G_1$, $G_2$, and $\sim G_3$ are transformed into clausal forms as follows:

$$\begin{cases} \omega(G_1) = P \vee \sim Q \vee R \\ \omega(G_2) = \sim P \vee T \\ \omega(\sim G_3) = P \wedge R \end{cases}$$

from which the following set of clauses S can be obtained:

$$S \begin{cases} c_1 = P \vee \sim Q \vee R] \\ c_2 = \sim P \wedge T \\ x_1 = P \\ x_2 = R \end{cases}$$

Thus, if this set of clauses S is shown to be unsatisfiable, then $G_3$ can be proved from $G_1$ and $G_2$.

Now, it can easily be seen that S satisfies the invert Horn condition, so that the algebraic proving principle is applicable. Therefore, the unsatisfiability of S can be checked by determining the existence of non-negative solution $\alpha_i, \beta_i \in Z$ for the proof equation which in this case has the following form:

$$d_1 \cdot \alpha_1 + d_2 \cdot \alpha_2 + e_1 \cdot \beta_1 + e_2 \cdot \beta_2 = (1, \emptyset) \qquad (1)$$

where $d_i$ and $e_i$ are the following sentences obtained from the clauses $c_i$ and $x_i$, respectively:

$$\begin{cases} d_1 = (1, (P, \sim Q, R)) \\ d_2 = (1, (\sim P, T)) \\ e_1 = (1, (P)) \\ e_2 = (1, (R)) \end{cases} \qquad (2)$$

As mentioned in the previous section, no variable nor substitution are involved in the propositional logic so that the ring of scalars R of the module D coincides with the ring of integers Z, and the generators of the module D are also the bases which in this case are:

$$\begin{cases} b_0 = (1, \phi) \\ b_1 = (0, (P)) \\ b_2 = (0, (Q)) \\ b_3 = (0, (R)) \\ b_4 = (0, (T)) \end{cases}$$

so that the proof equation in the simultaneous form becomes simple equations on Z, each for each basis, which in this case can be written in matrix form as follows:

$$\begin{pmatrix} 0 & 0 & 1 & 1 \\ 1 & -1 & 1 & 0 \\ -1 & 0 & 0 & 0 \\ 1 & 0 & 0 & 1 \\ 0 & 1 & 0 & 0 \end{pmatrix} \cdot \begin{pmatrix} \alpha_1 \\ \alpha_2 \\ \beta_1 \\ \beta_2 \end{pmatrix} = \begin{pmatrix} 1 \\ 0 \\ 0 \\ 0 \\ 0 \end{pmatrix} \qquad (3)$$

which can be solved by any known method such as by elimination.

At any rate, this system of simultaneous equations does not have any solution, so there is obviously no non-negative solution. Thus, the set of clauses S is satisfiable, which implies that $G_3$ cannot be proved from $G_1$ and $G_2$.

8.2 A case of predicate logic of first order

Here, an example of the proving problem is from the example 3 of the section 1 above. Namely, given the following $G_1$, $G_2$, and $G_3$ as axioms:

$G_1$: "For every liar there exists someone who does not trust him"

$G_2$: "Everyone is trusted by those he trusts"

$G_3$: "Anyone who is not trusted by someone is not trusted by everyone"

to determine whether the following $G_b$ is true:

$G_b$: "If there is one liar, no one trusts no one"

This problem is equivalent to that of satisfiability of the following set of clauses S:

$$S \begin{cases} c_1 = \sim F(X) \vee \sim B(yy(X), X) \\ c_2 = \sim B(X, Y) \vee B(Y, X) \\ c_3 = B(Y, X) \vee \sim B(Z, X) \\ s_1 = F(a) \\ s_2 = B(b, c) \end{cases}$$

where $s_1$ and $s_2$ are clauses added from the clausal form of the negation of $G_b$:

$$\omega(\sim G_b) = F(a) \wedge B(b, c)$$

and a, b, and c are Skolem constants.

Now, it can easily be seen that this S satisfies the normal Horn condition. so that the algebraic proving principle is applicable. Therefore, the unsatisfiability of S can be checked by determining the existence of non-negative solution $\alpha_i, \beta_i \in R$ for the proof equation which in this case has the following form:

$$d_1 \cdot \alpha_1 + d_2 \cdot \alpha_2 + d_3 \cdot \alpha_3 + e_1 \cdot \beta_1 + e_2 \cdot \beta_2 = (1, \emptyset) \qquad (4)$$

where $d_i$ and $e_i$ are the following sentences obtained from the clauses $c_i$ and $s_i$, respectively:

$$\begin{cases} d_1 = (1, (\sim F(X), \sim B(yy(X), X))) \\ d_2 = (1, (\sim B(X, Y), B(Y, X))) \\ d_3 = (1, (B(Y, X), \sim B(Z, X))) \\ e_1 = (1, (F(a))) \\ e_2 = (1, (B(b, c))) \end{cases}$$

The generators in this case are:

$$\begin{cases} b_0 = (1, \phi) \\ b_1 = (0, (F(A))) \\ b_2 = (0, (B(C, D))) \end{cases}$$

so that the proof equation in the simultaneous form becomes a system of three simultaneous equations, each for each generator, which in this case can be written in matrix form as follows:

$$\begin{pmatrix} -b_0 & 0 & 0 & b_0 & b_0 \\ f_1 & 0 & 0 & f_0 & 0 \\ a_1 & a_2 & a_3 & 0 & a_0 \end{pmatrix} \begin{pmatrix} \alpha_1 \\ \alpha_2 \\ \alpha_3 \\ \beta_1 \\ \beta_2 \end{pmatrix} = \begin{pmatrix} b_0 \\ 0 \\ 0 \end{pmatrix} \quad (5)$$

where $$\begin{cases} f_1 = -(0, (F(X))) \\ f_0 = (0, (F(a))) \\ a_1 = -(0, (B(yy(X), X))) \\ a_2 = -(0, (B(X, Y))) + (0, (B(Y, X))) \\ a_3 = (0, (B(Y, X))) - (0, (B(Z, X))) \\ a_0 = (0, (B(b, c))) \end{cases}$$

This system of simultaneous equations can be solved as follows.

First of all, the first equation is, by definition of R, equivalent to the following equation:

$$-\mu(\alpha_1) + \mu(\beta_1) + \mu(\beta_2) = 1 \quad (6)$$

This alone does not tell anything specific about $\alpha_1$, $\beta_1$, and $\beta_2$. This will be utilized later as a constraint to be imposed upon $\alpha_1$, $\beta_1$, and $\beta_2$ obtained from second and third equations.

The second and third equations are transformed to equations homomorphic to them, as follows.

Note that these equations are composed as sums and differences of the terms (in a usual sense) of a general form such as:

$$(0, (F(t1))) \cdot \gamma 1 \text{ or } (0, (B(t2, t3))) \cdot \gamma 2$$

In order to deal with such terms, a transformation called r-transformation which transforms these terms to other expressions in other module is defined by the following three rules:

$$\begin{array}{ll}
(0, F(t1))) \cdot \gamma 1 & \to F(t1) \cdot \gamma 1 \\
(0, (B(t2, t3))) \cdot \gamma 2 & \to B(t2, t3) \cdot \gamma 2 \\
F(t1) \cdot \gamma 1 & \to F1 * t1 * \gamma 1 \\
B(t2, t3) \cdot \gamma 2 & \to (B1 * t2 + B2 * t3) * \gamma 2 = \\
& \quad B1 * t2 * \gamma 2 + B2 * t3 * \gamma 2 \\
f(t4, t5, \cdots) & \to f1 * t4 + f2 * t5 + \cdots
\end{array} \quad \begin{array}{l} [r1] \\ \\ [r2] \\ \\ \\ [r3] \end{array}$$

where "+" is a commutative addition, "*" is a non-commutative product, and different symbols generally are distinct. This r-transformation gives a kind of homomorphism, so that if the original equation Eq. has a solution, then the r-transformed equation r(Eq.) also has a solution. The converse, however, may not be true, i.e., even if the r-transformed equation r(Eq.) has a solution. Eq. may not has one. The main reason to introduce this r-transformation is calculational, i.e., it is much easier to solve r(Eq.) than Eq. itself.

By this r-transformation, the second and third equations of the simultaneous equations to be solved are transformed as follows:

$$-F1 * X * \alpha_1 + F1 * a * \beta_1 = 0 \quad (7a)$$

$$-B1 * yy * X * \alpha_1 - B2 * X * \alpha_1 - B1 * X * \alpha_2 - \quad (7b)$$

$$B2 * Y * \alpha_2 + B1 * Y * \alpha_2 + B2 * X * \alpha_2 +$$

$$B1 * Y * \alpha_3 + B2 * X * \alpha_3 - B1 * Z * \alpha_3 -$$

$$B2 * X * \alpha_3 + B1 * b * \beta_2 + B2 * c * \beta_2 = 0$$

Substituting (in a usual sense):

$$\begin{array}{ll} X * \alpha_1 = X1 & Y * \alpha_2 = Y2 \\ X * \alpha_2 + X2 & Y * \alpha_3 = Y3 \\ X * \alpha_3 = X3 & Z * \alpha_3 = Z3 \end{array} \quad (8)$$

these equations are simplified to:

$$-F1 * X1 + F1 * a * \beta_1 = 0 \quad (9a)$$

$$-B1 * yy * X1 - B2 * X1 - B1 * X2 - \quad (9b)$$

$$B2 * Y2 + B1 * Y2 + B2 * X2 +$$

$$B1 * Y3 + B2 * X3 - B1 * Z3 -$$

$$B2 * X3 + B1 * b * \beta_2 + B2 * c * \beta_2 = 0$$

Now, collecting terms with coefficient F1, B1, and B2 separately, these equation becomes:

$$\begin{array}{ll} -X1 + a * \beta_1 = 0 & (9a1) \\ -yy * X1 - X2 + Y2 + Y3 - Z3 + b * \beta_2 = 0 & (9b1) \\ -X1 - Y2 + X2 + X3 - X3 + c * \beta_2 = 0 & (9b2) \end{array}$$

From eq. (9a1), it follows:

$$X1 = a * \beta_1 \quad (10)$$

Substituting (in a usual sense) eq. (10) into eq. (9b2) and rearranging, it follows:

$$X2 - Y2 = a * \beta_1 - c * \beta_2$$

Recalling that the solutions to be found are non-negative ones, the possible solutions must be in the following forms:

$$X2 = a * \beta_1 + E1 \quad (11)$$

$$Y2 = c * \beta_2 + E1 \quad (12)$$

where E1 is an arbitrary element which can be set to zero. On the other hand, substituting (in a usual sense) eqs.(10), (11), and (12) into eq.(9b1), it follows:

$$Y3 - Z3 = yy * a * \beta_1 + a * \beta_1 - c * \beta_2 - b * \beta_2$$

Again, recalling that the solutions to be found are non-negative ones, the possible solutions must be in the following forms:

$$Y3 = yy * a * \beta_1 + a * \beta_1 + E2 \quad (13)$$

$$Z3 = b * \beta_2 + c * \beta_2 + E2 \quad (14)$$

where E2 is an arbitrary element which can be set to zero. Now, since both Y3 and Z3 have at least two terms, as must be a sum of at least two substitutions. Thus, let:

$$\begin{array}{l} \alpha_3 = \alpha_{31} + \alpha_{32} \\ X3 = X * \alpha_3 = X * \alpha_{31} + X * \alpha_{32} = X31 + X32 \\ Y3 = Y * \alpha_3 = Y * \alpha_{31} + Y * \alpha_{32} = Y31 + Y32 \\ Z3 = Z * \alpha_3 = Z * \alpha_{31} + Z * \alpha_{32} = Z31 + Z32 \\ Y31 = yy * a * \beta_1, Y32 = a * \beta_1 \\ Z31 = b * \beta_2, Z32 = c * \beta_2 \end{array} \quad \begin{array}{l} (15) \\ \\ \\ \\ (16) \\ (17) \end{array}$$

while X3 = X31 + X32 remains to be specified.

At this point, auxiliary variables called correlating variables are introduced for the purpose of bookkeeping of various terms. Namely, a term such as $B1*Y*\beta_2+B2*X*\alpha_2$, for example, originates from a single term $(0, (B(Y, X)))\cdot\alpha_2$ of the original third equation which appear as separate terms as a result of r-transformation. Therefore, when cancelling such terms, a care must be taken to cancel these terms together, so as not to have only a fraction of the original terms remaining. To show such correspondences among the terms explicitly, different correlating variables are to be multiplied on terms originating from different original terms. The result for eqs. (9b1) and (9b2), taking eqs. (15), (16), and (17) into account, are as follows:

$$-p*yy*X1-q*X2+r*Y2+s*Y31+t*Y32-u*Z31+v*Z32+w*b*\beta_2=0 \quad (9b3)$$

$$-p*X1-q*Y2+r*X2+s*X31+t*X32-u*X31-v*X32+w*c*\beta_2=0 \quad (9b4)$$

where, p, q, r, s, t, u, v, and w are correlating variables. By means of these correlating variables, it can easily be recognized that, for example, if the first and the fourth terms are to cancel in eq. (9b3), then p=s so that the first and fourth terms in eq. (9b4) also cancel. Furthermore, if p and s is not equal to any other correlating variables, then the first term can cancel only with the fourth term.

Now, substituting (in a usual sense) eqs. (10), (11), (12), (16), and (17) into eq. (9b3), it follows:

$$-p*yy*a*\beta_1-q*a*\beta_1+r*c*\beta_2+s*yy*a*\beta_1+t*a*\beta_1-u*b*\beta_2-v*c*\beta_2+w*b*\beta_2=0$$

which, upon rearranging, becomes:

$$(s-p)*yy*a*\beta_1+(t-q)*a*\beta_1+(r-v)*c*\beta_2+(w-u)*b*\beta_2=0$$

which implies:

$$s=p,\ t=q,\ r=v,\ w=u \quad (18)$$

On the other hand, substituting (in a usual sense) eqs. (10), (11), (12), and (18) into eq. (9b4), it follows:

$$-p*a*\beta_1-q*c*\beta_2+v*a*\beta_1+p*X31+q*X32-u*X31-v*X32+u*c*\beta_2=0$$

which, upon rearranging, becomes:

$$p*X31+q*X32-u*X31-v*X32=p*a*\beta_1+q*c*\beta_2-v*a*\beta_1-u*c*\beta_2$$

Recalling that the solutions to be found are non-negative ones, and remembering that $u \neq v$, the possible solutions must be in the following forms:

$$X31=a*\beta_1 \quad (19)$$

$$X32=c*\beta_2 \quad (20)$$

From eqs. (10), (11), (12), (16), (17), (19), and (20), undoing the substitutions (in a usual sense) of eqs. (8) and (15), and setting $\beta_1=1$, it follows:

$$\left.\begin{array}{lll} X\cdot\alpha_1=a, & X\cdot\alpha_2=a, & Y\cdot\alpha_2=c \\ X\cdot\alpha_{31}=a, & Y\cdot\alpha_{31}=yy*a, & Z\cdot\alpha_{31}=c \\ X\cdot\alpha_{32}=c, & Y\cdot\alpha_{32}=a, & Z\cdot\alpha_{32}=b \end{array}\right\} \quad (21)$$

from which the following candidate for the solutions can be obtained:

$$\left.\begin{array}{rl} \alpha_1 &= \{a/X\} \\ \alpha_2 &= \{a/X, c/Y\} \\ \alpha_3 &= \alpha_{31}+\alpha_{32} \\ &= \{a/X, yy(a)/Y, c/Z\}+\{c/X, a/Y, b/Z\} \end{array}\right\} \quad (22)$$

It can be verified that these solutions satisfy the second and third equations of the simultaneous form of the proof equation. Moreover, it can also be verified that these solutions also satisfy the first equation of the simultaneous form of the proof equation. Thus, these are the desired non-negative solutions.

Since the proof equation has a non-negative solution in this example, the set of clauses S is unsatisfiable, and therefore Gb is proved from $G_1$, $G_2$, and $G_3$.

8.3 Remarks on Horn conditions

In the section 5, it is shown in the proof of the algebraic proving principle (Theorem 5) that the Horn conditions must be satisfied by the set of clauses in order for the theorem to hold. On the other hand, in the above examples, the problems are such that this Horn conditions are satisfied from the beginning. In practice, a need may arise for checking that a given set of clauses actually satisfies the Horn conditions. However, it has been shown that in the predicate logic of first order, an arbitrary set of clauses can be transformed without affecting the satisfiability to another set of clauses which satisfies the Horn conditions.(See "Logic for problem solving" by R. Kowalsky, The COMPUTER SCIENCE LIBRARY: Artificial Intelligence Series; North-Holland, 1979)

Furthermore, the known algorithm exists for checking the Horn conditions for a set of clauses. Thus, the Horn conditions do not restrict an applicability of the algebraic proving principle in a practical circumstances. For this reason, the Horn conditions on the set of clauses are assumed in the following description of the embodiments of an apparatus for the automated theorem proving.

9. EMBODIMENTS OF AN APPARATUS FOR AUTOMATED THEOREM PROVING BY THE ALGEBRAIC PROVING PRINCIPLE 9.1 First embodiment (for propositional logic)

Referring now to FIG. 1, there is shown a first embodiment of an apparatus for automated theorem proving according to the present invention, which is designed to deal with the problems of propositional logic.

This first embodiment of apparatus for automated theorem proving comprises a transformation means 10 for suitably transforming externally supplied input data, storing means 20 for storing data transformed by the transforming means 10, and an analyzing means 30 for analyzing the data stored by the storing means 20 in a manner to be described in detail below and producing a result of an analysis as an output. The storing means 20 has an area U to be used interactively with the transforming means 10, while the analyzing means 30 has its own memory unit 35 which serves as a temporary memory to be utilized in a course of analysis. In particular, there are provided an area X and a solvability flag g in this memory unit 35,00 which will be utilized in the analysis.

The operation of this embodiment of apparatus for automated theorem proving is outlined in a flow chart of FIG. 2. Namely, first, at the step 100, the input data representing the set of clauses $S=\{c_{1\ldots n}\}$ to be proved are transformed by the transforming means 10 into an expression $E:\{a_{1\ldots n}\}$ in terms of elements of the module D, and stored in the storing means 20. Next, at the step 200, the analyzing means 30 checks the existence of non-negative solutions to the proof equation with $\{a_{1\ldots n}\}$ as coefficients and elements $\alpha_{1\ldots}$ $n$ of the ring of scalars R of the module D as unknowns. Then, at the step 300, the input data are determined as unsatisfiable when the non-negative solutions exist, and satisfiable otherwise. On the basis of such determination of the satisfiability of the input data, the output is produced to indicate that the problem is provable if the input data are determined as unsatisfiable, or not so otherwise.

A detail of the operation outlined above will now be described. Here, for the sake of definiteness, the problem used in the section 8.1 above (referred hereafter as the problem A) will be taken as an example to illustrate the operation.

First of all, in this embodiment, externally supplied input data are to be given in a form of a set of clauses which is described by representing each atomic proposition by a capital letter (referred hereafter as a propositional symbol), and negation by "−", with the whole set as well as each clause in the set being enclosed between "("and")" and adjacent clauses in the set being separated by ";". It is also assumed that the input data are already put in such a form that the set is satisfying one of the Horn conditions.

For the problem A, the input data have the following form:

$$((P, -Q, R)); (-P, T); (P); (R))$$

The transformation means 10 utilizes the storing means 20 to transform such input data, in accordance with the flow chart of FIG. 3, as follows.

At the step 101, a number of clauses n and a number of propositional symbols l are counted. Meanwhile, at the step 102, all the propositional symbols are tabulated in a form of a propositional symbol table F, as shown in FIG. 4 for the problem A which involves four propositional symbols P, Q, R, and T.

Then, at the step 103, an area U of (l+1) rows by n columns are prepared in the storing means 20. An entire area U is initialized to 0 at this point. For the problem A which involves four clauses and four propositional symbols, the area U has the size of 5 by 4.

Next, at the step 104, the literals in each clause are registered at the area U by the rule that a literal having the j-th propositional symbol in the i-th clause is to be entered at the (J+1)-th row of the i-th column. Here, the propositional symbols are ordered by their order of appearance in the propositional symbol table F, from top to bottom, whereas the clauses are ordered by their order of appearance in the input data, from left to right.

Finally, at the step 105, a number $\kappa$ of literals involving the negation symbol "−" is counted for each column, and a number (1−$\kappa$) is entered at the first row of this column. This completes the transformation.

At this point, the entries in the area U, for the problem A, appears as shown in FIG. 5. Note that these entries of the area U corresponds to the coefficient matrix of the simultaneous form of the proof equation, eq. (3).

Next, the analyzing means 30 attempts to solve the proof equation specified by the coefficient matrix constructed in the area U of the storing means 30, so as to be able to answer the problem, in accordance with a flow chart of FIG. 6, as follows.

First, at the step 201, the coefficient matrix in the area U of the storing means 30 is copied to the area X in the memory unit 35. Next, at the step 202, a number of unknowns needed, which is the same as the number of columns of the coefficient matrix, is counted, and distinctive unknown symbols are given to these unknowns which are tabulated in a form of a unknown table Q, as shown in FIG. 7 for the problem A which requires four unknowns @1, @2, @3, and @4. Then, at the step 203, for each row of the coefficient matrix, a coefficient number (either +1 or −1) of the entry in the i-th column multiplied by the i-th unknown symbol are summed for all columns, and the sum is equated with 1 for the first row and 0 for the other rows. Here, the unknown symbols are ordered by their order of appearance in the unknown table Q, from top to bottom.

It can easily be recognized that at this point, the proof equation in the simultaneous form has been constructed in the area X, which for the problem A appears as follows: (spaces inserted for the sake of clarity)

$$\begin{cases} & @3 + @4 = 1 \\ @1 - @2 + @3 & = 0 \\ -@1 & = 0 \\ @1 & + @4 = 0 \\ & @2 & = 0 \end{cases}$$

Then, at the step 204, the solvability flag g in the memory unit 35 and is set to 1.

Then, the following steps are carried out.

[m1] Starting from the first equation (step 205), for each equation in the area X, repeat following [m2] and [m3] as many times as possible (steps 215, 216).

[m2] If there is an equation with only one unknown in the left hand side (step 206), compare the sign of the unknown with that of a constant in the right hand side (step 207). If they are different, change the solvability flag g to 0 and terminate (step 208). Otherwise, set the sign of the both sides to positive (+)(step 209), and register the constant as a solution for that unknown in the unknown table Q and delete this equation from the area X (step 210).

[m3] Substitute the newly registered solution in the other equations (step 211). Bring all the constants to the right hand side, and if an equation of a form "0=0" is obtained, delete it from the area X (step 212). If an equation of a form "0=p", where p≠0 is a constant, is obtained (step 214), set the solvability flag g to 0 and terminate (step 208).

[m4] If no equation is left in the area X, go to next [m5] (step 217). Otherwise, each remaining equation has at least two unknowns in the left hand side. Search for an unknown appearing in more than one equations (step 218). If any, substitute one such equation into others so as to eliminate that unknown (step 219), delete this one equation used for substitution from the area X (step 220), and go to [m1].

[m5] If no equation is left in the area X (step 221) and the solutions for all the unknowns registered in the unknown table Q are 0s (step 222), set the solvability flag g to 0 and terminate (step 208). Otherwise, simply terminate.

For the problem A, the process after the step 204 goes as follows.

1. From the fifth equation (@2=0), a solution 0 is registered for the unknown @2 by [m2], 2. By [m3], this solution is substituted, leaving the following equations:

$$\begin{cases} & @3 + @4 = 1 \\ @1 + @3 & = 0 \\ -@1 & = 0 \\ @1 & + @4 = 0 \end{cases}$$

3. From the third equation (−@1=0), a solution 0 is registered for the unknown @1 by [m2], 4. By [m3], this solution is substituted, leaving the following equations:

$$\begin{cases} & @3 + @4 = 1 \\ + & @3 \phantom{+ @4} = 0 \\ & \phantom{@3 +} @4 = 0 \end{cases}$$

5. From the last equation (@4=0), a solution 0 is registered for the unknown @4 by [m2],
6. By [m3], this solution is substituted, leaving the following equation:

0=1 so that the solvability flag g is set to 0 and the process terminates.

It can easily be seen that the solvability flag g indicates 0 when there is no non-negative solutions, and 1 otherwise. Accordingly, the analyzing unit 30 determines the input data as satisfiable when the solvability flag g is 0, and unsatisfiable otherwise. On the basis of such determination of the satisfiability of the input data, the output is produced to indicate that the problem is provable if the input data are determined as unsatisfiable, or not so otherwise.

For the problem A, since the process terminates with the solvability flag g=0, the input data are determined as satisfiable, so that the problem is not provable, in agreement with the earlier discussion of this problem.

It is to be noted that this embodiment can be modified such that instead of providing the analyzing means 30 with its own memory unit 35, the operation of analysis is performed by the analyzing means 30 and the storing means 20 interactively.

It is also to be noted that the steps involved in [m1] to [m5] above shows only one exemplary implementation of a method of determining the existence of non-negative solutions to the proof equation, which can suitably be modified to accommodate other implementations or other methods.

9.2 Second embodiment (for predicate logic of first order)

This second embodiment of an apparatus for automated theorem proving according to the present invention is designed to deal with the problems in predicate logic of the first order.

This second embodiment generally has the same configuration as that of the first embodiment shown in FIG. 1, except that now, as shown in FIG. 8, the analyzing means 30 further comprises an r-transformation unit 31, a Y solving unit 32, a Z solving unit 33, and a checking unit 34, in addition to the memory unit 35. Furthermore, there are now provided an area Y and an area z in addition to the area X and the solvability flag g in this memory unit 35.

The outline of the operation of this second embodiment of an apparatus for automated theorem proving is also the same as that of the first embodiment shown in FIG. 2, which will not be repeated here.

A detail of the operation will now be described. Here, for the sake of definiteness, the problem used in the section 8.2 above (referred hereafter as the problem B) will be taken as a worked out example to illustrate the operation.

First of all, in this embodiment, externally supplied input data are to be given in a form of a set of clauses which is described by representing each predicate by a capital letter, and negation by "−", with the whole set as well as each clause in the set being enclosed between "(" and ")" and adjacent clauses in the set being separated by ";".

For the problem B, the input data have the following form:

$((-F(X), -B(yy(X), X)); (-B(X, Y), B(Y, X)); (B(Y, X), -B(Z, X));$
$(F(a)); (B(b, c)))$

It is also assumed that the input data are already put in such a form that the set is satisfying one of the Horn conditions.

Figure 9:
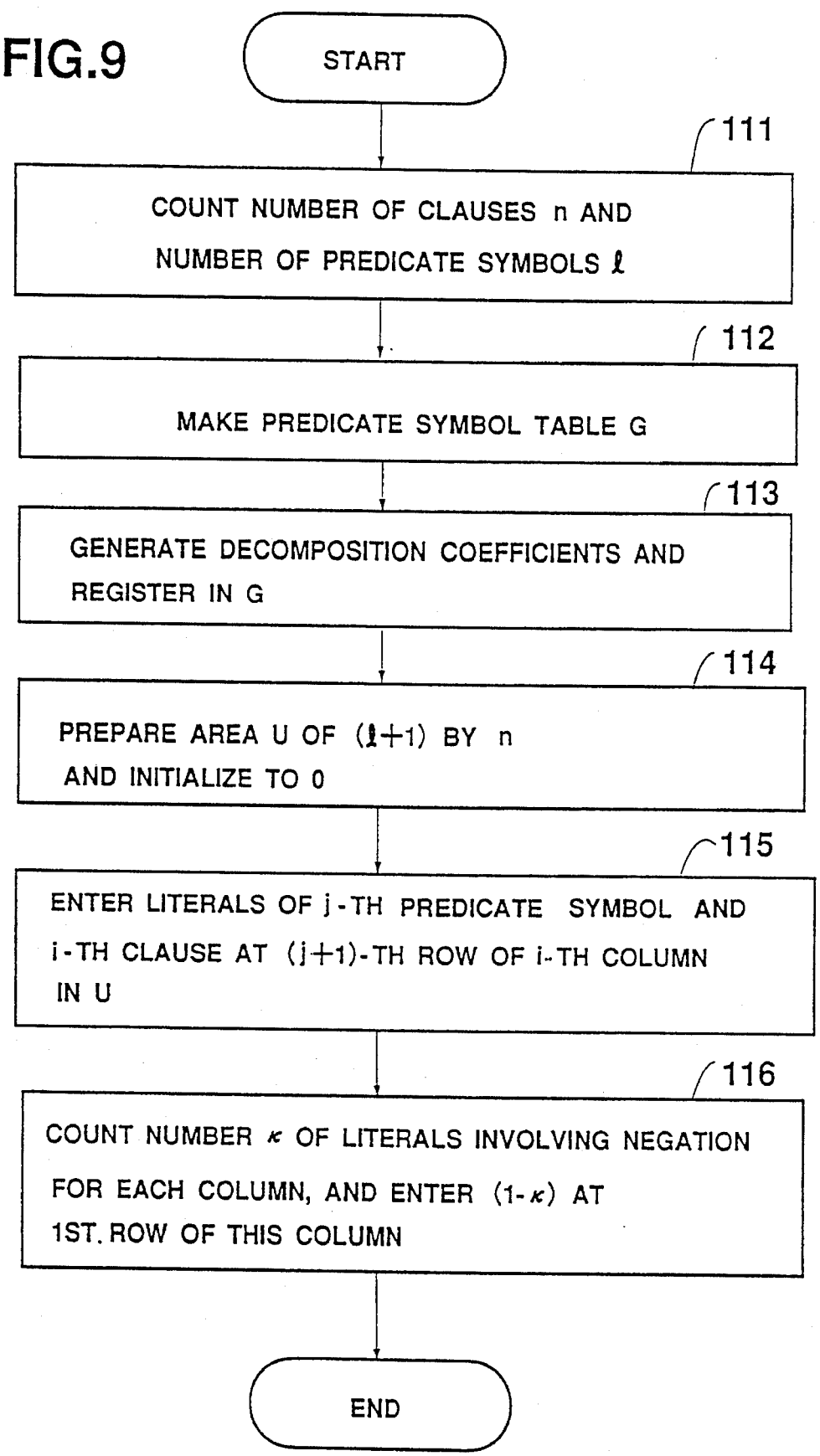
FIG. 9 is a flow chart for the operation of a transformation means in the second embodiment.

The transformation means 10 utilizes the storing means 20 to transform such input data, in accordance with a flow chart of FIG. 9, as follows.

At the step 111, a number of clauses n and a number of predicate symbols l are counted. Meanwhile, at the step 112, all the predicate symbols are tabulated in a form of a predicate symbol table G, along with a number of their arguments, as shown in FIG. 10 for the problem B which involves two predicate symbols F and B. In addition, at the step 113, decomposition coefficients are given for each predicate symbol as many as the number of its arguments, each decomposition coefficient being given a distinct label made by attaching an integer numbering the arguments to the predicate symbol. These decomposition coefficients are also registered in the predicate symbol table G. For the problem B, the predicate F involves one argument whereas the predicate B involves two, as shown in FIG. 10.

Then, at the step 114, an area U of (l+1) rows by n columns are prepared in the storing means 20. An entire area U is initialized to 0 at this point. For the problem B which involves five clauses and two predicate symbols, the area U has the size of 3 by 5.

Next, at the step 115, the literals in each clause are registered at the area U by the rule that a literal having the j-th predicate symbol in the i-th clause is to be entered at the (J+1)-th row of the i-th column. Here, the propositional symbols are ordered by their order of appearance in the predicate symbol table G, from top to bottom, whereas the clauses are ordered by their order of appearance in the input data, from left to right.

Finally, at the step 116, a number κ of literals involving the negation symbol "−" is counted for each clause, and a number (1−κ) is entered at the first row of the respective column. This completes the transformation.

At this point, the entries in the area U, for the problem B, appears as shown in FIG. 11. Note that these entries of the area U corresponds to the coefficient matrix of the simultaneous form of the proof equation, eq. (5).

Next, the analyzing means 30 attempts to solve the proof equation specified by the coefficient matrix constructed in the area U of the storing means 30, so as to be able to answer the problem.

Figure 12:
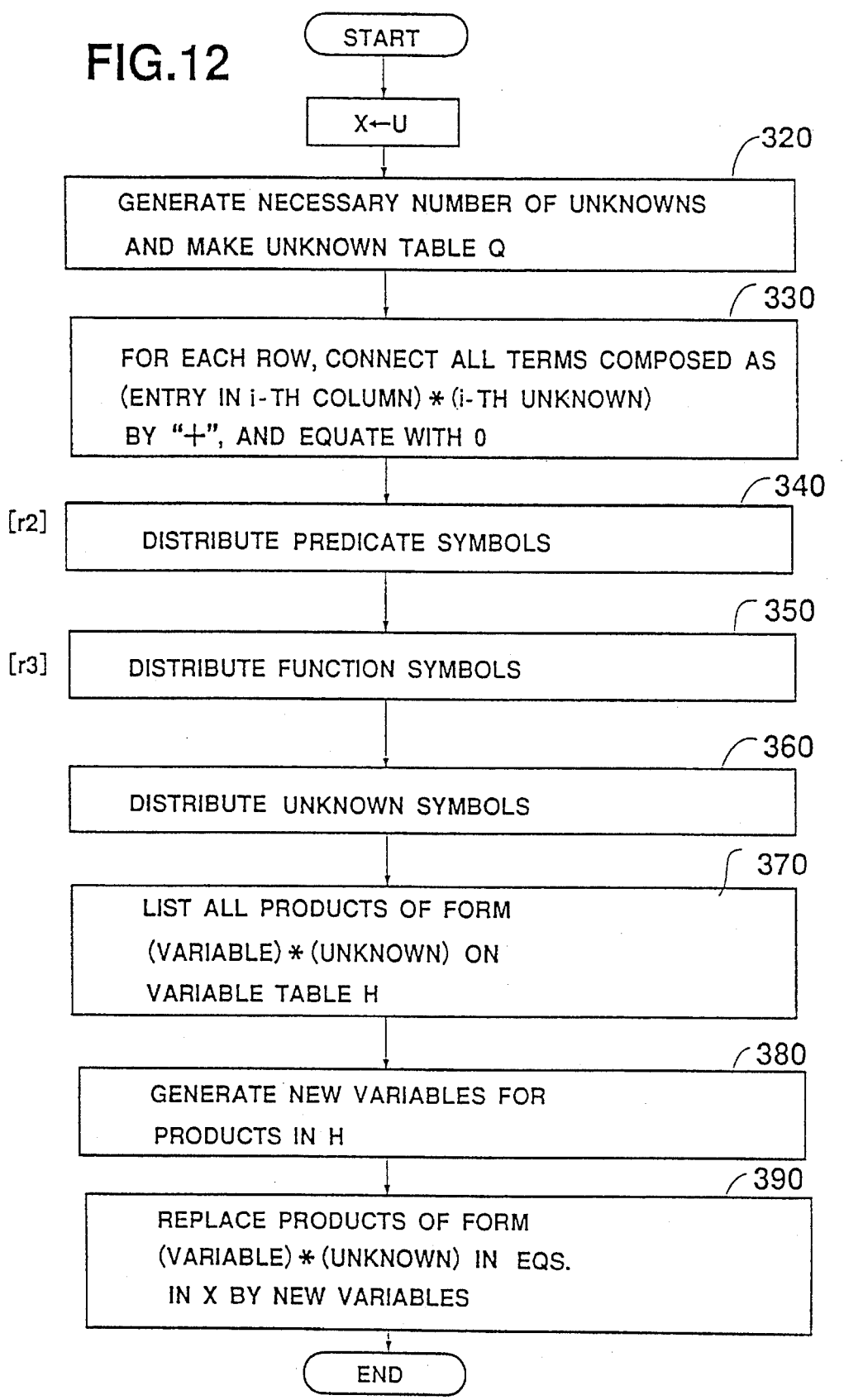
FIG. 12 is a flow chart for the operation of an r-transformation unit in the second embodiment.

First of all, the r-transformation unit 31 performs the r-transformation to the second and lower rows of the coefficient matrix constructed in the area U. As explained in the section 8.2 above, this is done by the three rules [r1], [r2], and [r3] described there, which are carried out by the r-transformation unit 31, in accordance with a flow chart of FIG. 12, as follows.

First, at the step 310, the coefficient matrix in the area U of the storing means 30 is copied to the area X in the memory unit 35.

Figures 13, 14:
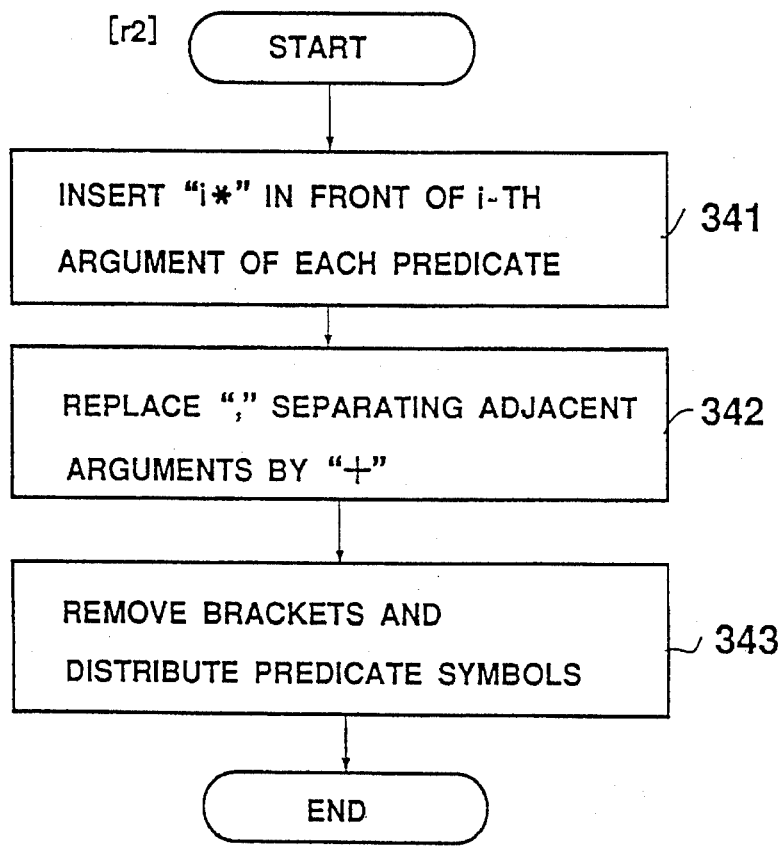
FIG. 13 is an illustration of an example of an unknown table to be utilized in the second embodiment.
FIG. 14 is a flow chart for one subroutine to be utilized by the r-transformation unit in the second embodiment.

Next, at the step 320, a number of unknowns needed, which is the same as the number of columns of the coefficient matrix, is counted, and distinctive unknown symbols are given to these unknowns which are tabulated in a form of a unknown table Q, as shown in FIG. 13 for the problem B which requires five unknowns @1, @2, @3, @4, and @5. At this point, entries for the multiplicities as well as those for the solutions in the unknown table Q are yet to be filled.

Then, at the step 330, for each row of the coefficient matrix, all the terms composed as the entry in the i-th column followed by "*" followed by the i-th unknown symbol are connected by "+", and these are equated with 0.

Here, the unknown symbols are ordered in by their order of appearance in the unknown table Q, from top to bottom.

Now, since in this embodiment the transformation corresponding to [r1] has already been taken care of in the input data, nothing needs to be done in this regard here.

So, next at the step 340, the distributing of the predicate symbols corresponding to [r2] is carried out. This is done in accordance with a subroutine shown in FIG. 14. Namely, at the step 341, for the i-th argument of each predicate, "i*" is inserted there, the arguments are ordered in by their order of appearance in the input data, from left to right. Then, at the step 342, "," separating adjacent arguments in each predicate is replaced by "+". Finally, at the step 343, the brackets enclosing the arguments are removed, and at the same time the predicate symbol is attached in front of each term of its arguments.

Next at the step 350, the distributing of the function symbols corresponding to [r3] is carried out. This is done in accordance with a subroutine shown in FIG. 15. Namely, at the step 351, for the i-th argument of each function, "i*" is inserted. Then, at the step 352, "," separating adjacent arguments in each predicate is replaced by "+". Finally, at the step 353, the brackets enclosing the arguments are removed, and at the same time the function symbol is attached in front of each term of its arguments. r0 Then, at the step 360, all the remaining brackets are removed and at the same time the unknowns are distributed according to the usual distribution law, such that every equation is in a form of a sum of terms.

At this point, for the problem B, eqs. (7a) and (7b) are produced in the area X.

Next, at the step 370, all the products of the form: (variable)*(unknown) are listed on a variable table H, as shown in FIG. 16 for the problem B. It can be seen that this variable table H corresponds to eq. (8). At the same time, for those unknowns which do not appear in the products listed on the variable table H, the entries for the multiplicities in the unknown table Q is filled by the unknown itself. As shown in FIG. 13, for the problem B such unknowns are @4 and @5.

Next, at the step 380, for each listed product a new distinct variable symbol is assigned and recorded in the variable table H.

Finally, at the step 390, these listed products in the equations on the area X are replaced by their newly assigned variable symbols. This completes the operation of the r-transformation unit 31.

At this point, for the problem B, eqs. (9a) and (9b) are produced in the area X.

Figure 17B:
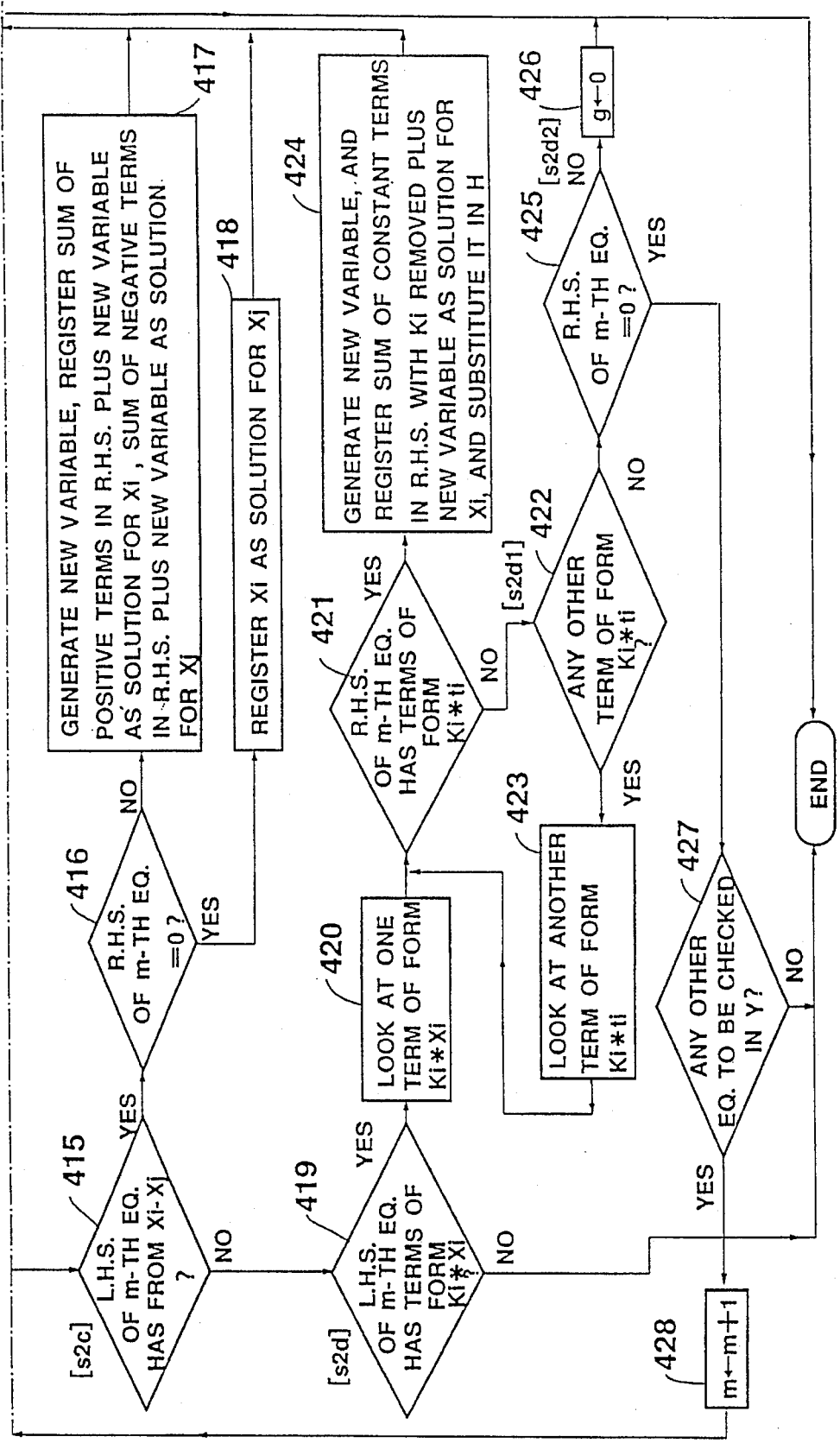

Following the completion of the operation by the r-transformation unit 31, the Y solving unit 32 begins its operation, in accordance with a flow chart of FIG. 17.

First, at the step 401, this Y solving unit 32 decomposes the equations in the area X to equations for different decomposition coefficients in which each equation involves the terms with a particular decomposition coefficient. The Y solving unit 32 then stores the results in the area Y and the area Z of the memory unit 35. Next, at the step 402, the Y solving unit 32 sets the solvability flag g in the memory unit 35 to 1, and proceeds to carry out the following steps.

[s1] For equations in the area Y, bring all the terms involving the variables to the left hand side, all the constant terms to the right hand side, and cancel the differences of the identical terms (step 403), and set a counter m to 1 (step 404).

s2] For the m-th equation in the area Y,

[s2a] if the left hand side is 0 (step 405) and (a) if the right hand side is also 0 (step 406), delete the m-th equation from the area Y (step 407) and if no equation is left in the area Y (step 408) then terminate.

(b) if the right hand side is not zero (step 406), set the solvability flag g to 0 and terminate (step 409)

[s2b] if the left hand side is a single variable (step 410), then if its coefficient is negative (step 411) multiply both sides by −1 (step 412), then if the right hand side is not negative, register this as a solution to the entry for the solution in the variable table H (step 414), and remove this m-th equation from the area Y.

[s2c] if the left hand side is two terms of pure variables of the form: Xi−Xj (step 415), and if the right hand side is not 0 (step 416) then register a new variable in the variable table H, and register a sum of the positive terms in the right hand side plus the new variable as a solution for Xi, a sum of the negative terms in the right hand side plus the new variable as a solution for Xj in the variable table H (step 417), or if the right hand side is 0 (step 416) register Xi as a solution for Xj in the variable table H (step 418).

[s2d] if the left hand side is not zero and has a term of a form Ki*Xi (ki coefficient, Xi variable)(step 419), then for each such term (steps 420),

[s2d1] If the right hand side has a term of a form Ki*ti with the same Kt including sign (ti constant) (step 421) then for each such term (step 422,423) register a new variable in the variable table H, and register a sum of all the constant terms in the right hand side with Ki removed plus the new variable as a solution for Xi, and substitute this solution for other occurrences of Xi in the entries for solutions in the variable table H (step 424).

[s2d2] if the right hand side does not have a term of a form Ki*ti with the same Ki including sign (ti constant) (step 421) and if it is not zero (step step 425), then set the solvability flag g to 0 and terminate (step 426), or if it is zero (step 425) and m-th equation is not the last equation in the area Y (step 427), then set the counter to m+1 (step 428) and go back to [s2] above, i.e., step 405, otherwise terminate (step 427).

[s3] If there is a new solution registered in the variable table H, substitute this into the other equations in the area Y, and go back to [s1] above, i.e., step 403 (step 429).

This completes the operation of the Y solving unit 32.

Figures 18, 19, 19A, 19B:
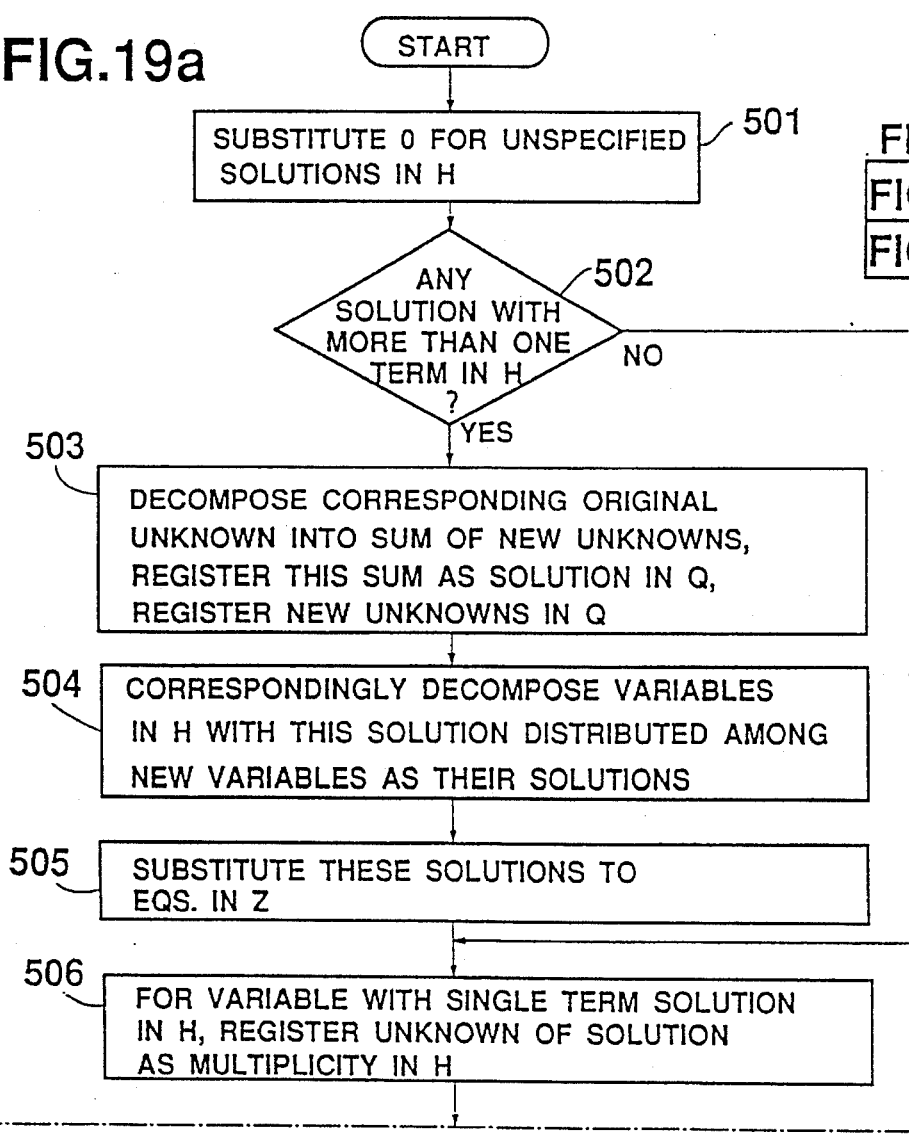
FIG. 18 is an illustration of the variable table in the second embodiment, showing its intermediate state in a course of the operation by the analyzing means.
FIG. 19, including
FIGS. 19a and 19b, is a flow chart for the first part of the operation of a Z solving unit in the second embodiment.
Figure 19B:
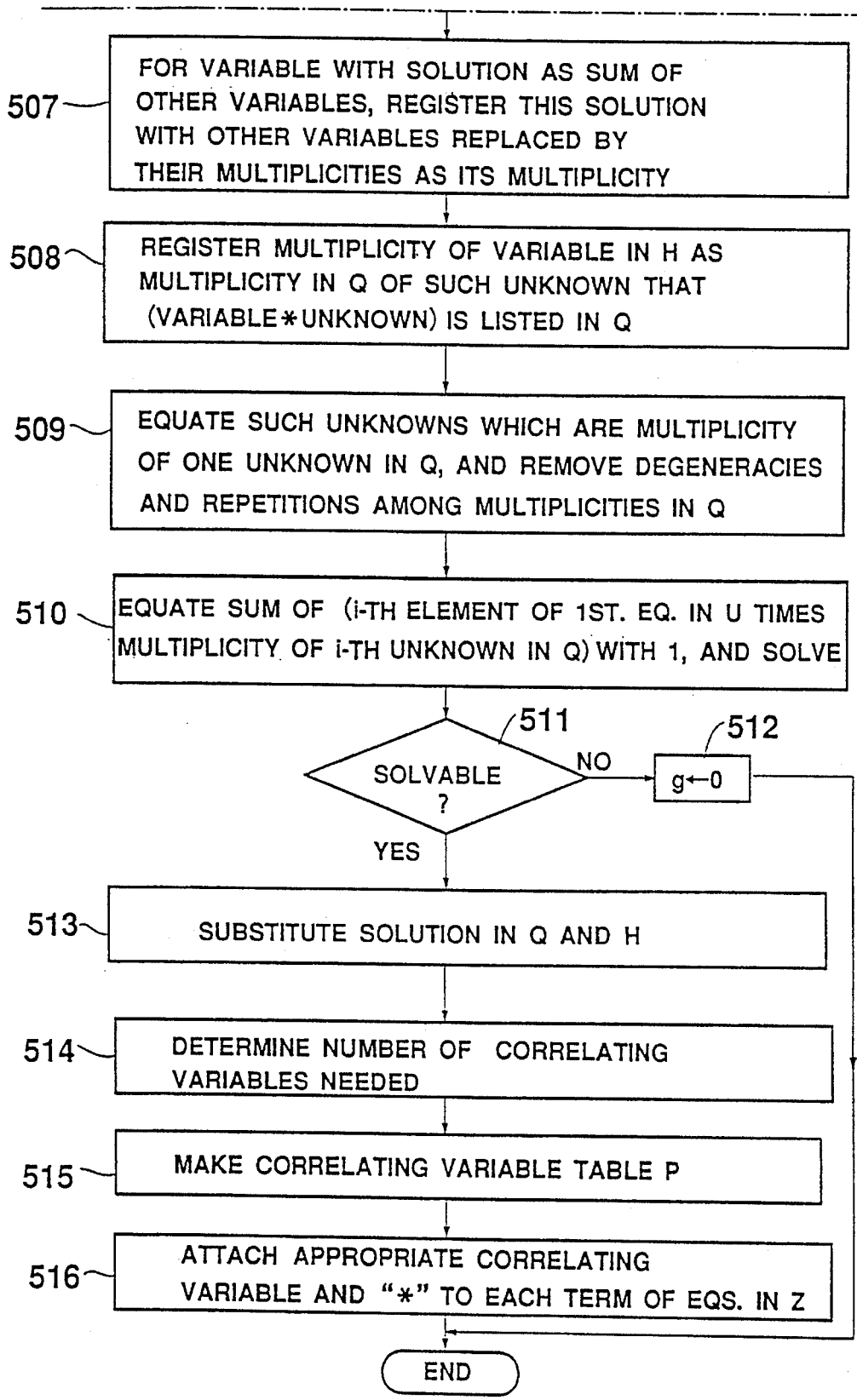

At this point, for the problem B, solutions of eqs. (10), (11), (12), (13), and (14) are produced in the area Y, so that the variable table H now appears as shown in FIG. 18.

Following the completion of the operation by the Y solving unit 32, the Z solving unit 33 begins its operation. This Z solving unit 33 operates in two parts. The first part is carried out in accordance with a flow chart of FIG. 19.

First, at the step 501, 0 is substituted for those variable in the variable table H for which the solution has not been registered. Then at the step 502, those solutions registered in the variable table H which involves more than one terms are searched. If none is found, the step 506 will be taken next.

If there is any, then at the step 503, the original unknown of the proof equation (i.e., element of ring R) corresponding to that variable for which the searched solution is a solution is decomposed into a sum of as many new unknowns as the number of terms found in the searched solution, and an expression for such sum is registered in the unknown table Q as a solution to that original unknown, while these new unknowns are also added to the unknown table Q.

Next, at the step 504, corresponding decomposition is carried out in the variables in the variable table H, and the searched solution is suitably distributed among the new variables as their solutions.

Then, at the step 505, decomposed expression is substituted for the decomposed variable in the equations in the area Z.

For the problem B, these operations of the Z solving unit 33 up to this point make the variable table H and the unknown table Q as shown in FIGS. 20 and 21, respectively.

Next, at the step 506, for those variables for which the solution registered in the variable table H is in a form of a single term, the unknown appearing in such a single term is registered as the multiplicity for that variable.

Next, at the step 507, for those variables for which the solution registered in the variable table H is in a form of a sum of other variables, an expression in which these other variables are replaced by their multiplicities in the expression for that solution is registered as the multiplicity for that variable.

Next, at the step 508, for each line of the variable table H, the multiplicity of that line is copied to the unknown table Q as the multiplicity of such an unknown which appears in the (variable*unknown) expression of that line of the variable table H.

For the problem B, these operations of the Z solving unit 33 up to this point make the variable table H and the unknown table Q as shown in FIGS. 22 and 23, respectively.

Next, at the step 509, those unknowns which are listed together as the multiplicity in one line of the unknown table Q are equated with each other, and one such unknown is substituted for the other equated unknowns in the unknown table Q so as to remove degeneracies among the unknowns, and the repetitions of the same unknown in one line of the unknown table Q are removed.

For the problem B, these operations of the Z solving unit 33 up to this point make the unknown table Q as shown in FIG. 24.

Next, at the step 510, the i-th element of the first line of the first equation in the area U of the storing means 20 multiplied by the multiplicity of the i-th unknown in the unknown table Q for all value of i are summed and equated with 1, and the solution to the resulting equation is sought. If unable to solve it (step 511), then the solvability flag g is set to 0 and terminate (step 512). If solved (step 511), then at the step 513, the solution found is substituted in the variable tables H as well as in the unknown table Q.

For the problem B, these operations of the Z solving unit 33 up to this point make the variable table H and the unknown table Q as shown in FIGS. 25 and 26, respectively.

Next, the equations in the area Z are inspected to determine a number of correlating variables needed (step 514), and that number of correlating variables are produced and tabulated in a form of a corresponding variable table P, as shown in FIG. 27 for the problem B which requires eight correlating variables p, q, r, s, t, u, v, and w (step 515). Then, appropriate correlating variables accompanied by "*" are attached to each terms in the equations in the area Z (step 516). This completes the first part of the operation of the Z solving unit 33. At this point, for the problem B, eqs. (9b3) and (9b4) are produced in the area Z.

Figures 28, 28A, 28B:
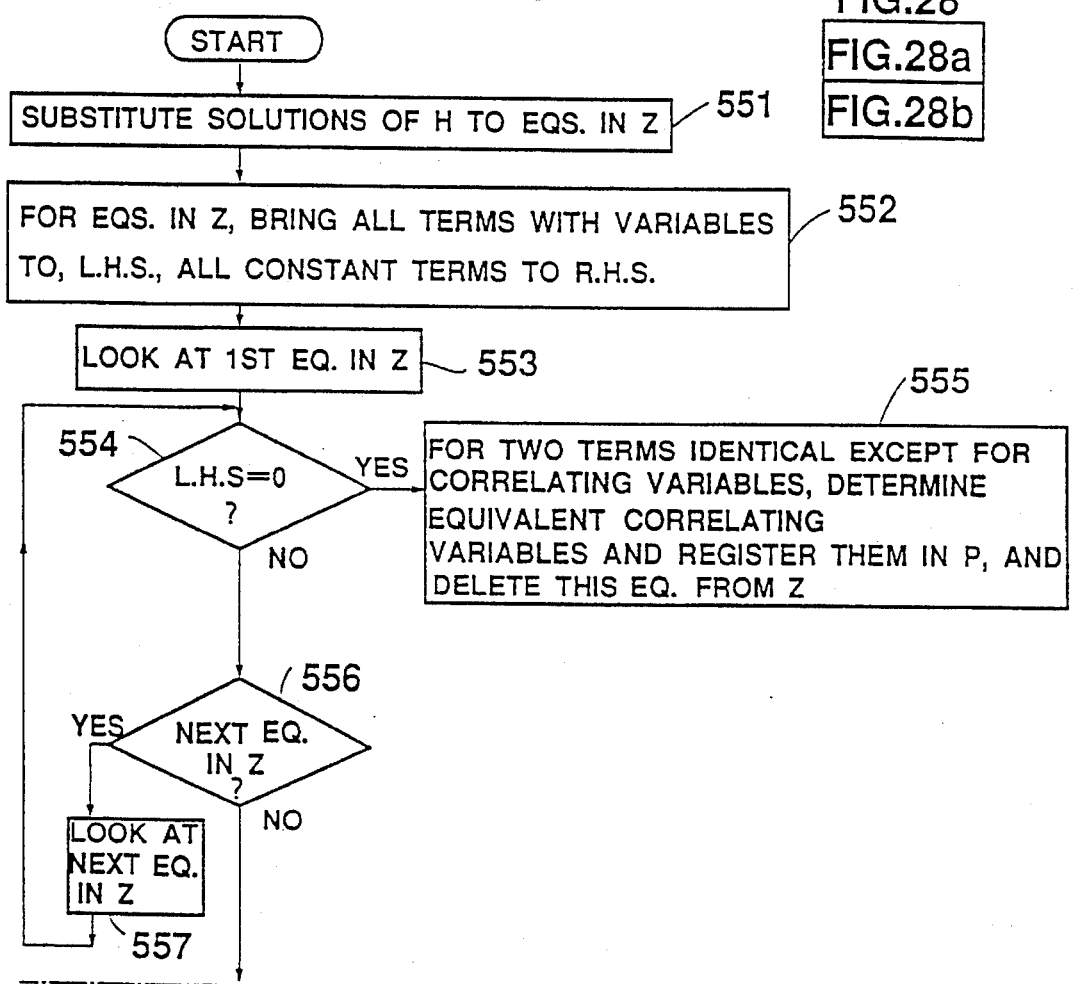
FIG. 28, including
FIGS. 28a and 28b, is a flow chart for the second part of the operation of a Z solving unit in the second embodiment.
Figure 28B:
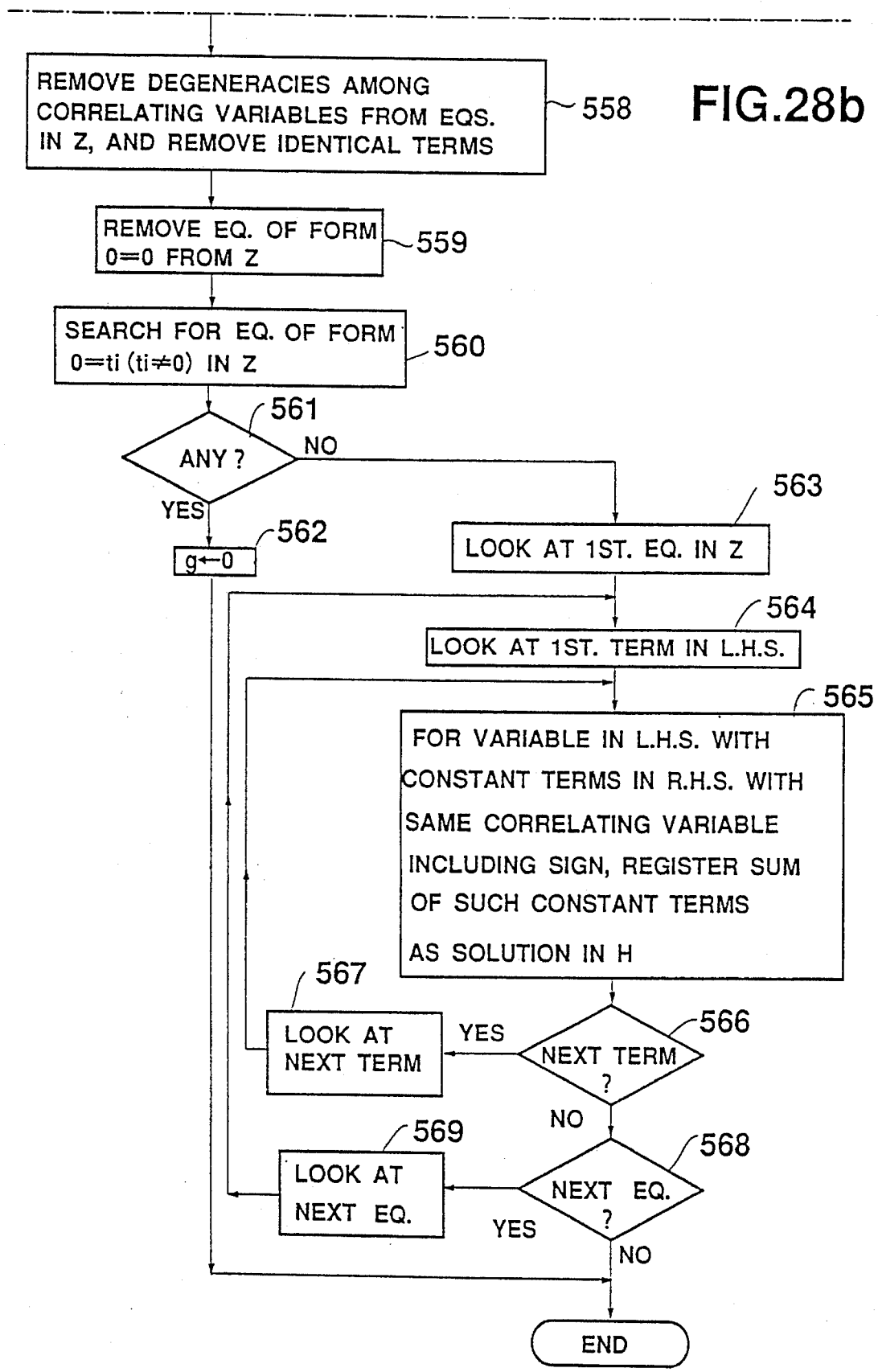

Following the completion of the first part of its operation, the Z solving unit 33 begins the second part of its operation, which is carried out in accordance with a flow chart of FIG. 28.

Here, the following steps are carried out.

[x1] The solutions in the variable table H are substituted into the equations in the area Z (step 551).

[x2] For each equation in the area Z, all the terms involving the variables are brought to the left hand side, while all the constant terms are brought to the right hand side (step 552).

[x3] Among all the equation in the area Z (steps 553, 556, 557), for those equations in the area Z in which the left hand side is 0 (step 554), any two constant terms in the right hand side which coincide with each other except for their correlating variables are paired together, and the relation between these terms necessary to make the left hand side equal to 0 is determined, and what is equal to each corresponding variable according to the determined relation is registered as equivalent correlating variables in the corresponding variable table P, and those equations are removed from the area Z (step 555).

[x4] For the equations in the area Z, the equivalent correlating variables according to the corresponding variable table P are replaced by a representative corresponding variable so as to remove degeneracies among the correlating variables, and the identical terms are removed (step 558), and any equation in a form of 0=0 is removed from the area Z (step 559).

[x5] Among the equations in the area Z, one in a form of $0 = t_i$ ($t_i \neq 0$ constant) is searched (step 560). If any (step 561), then the solvability flag g is set to 0 and the operation terminates (step 562). Otherwise, among all the equations in the area Z (steps 563, 568, 569), for each term in the left hand side (steps 564, 566, 567), the variable in the left hand side is equated with a sum of those constant terms in the right hand side which have the same corresponding variable as that variable including signs, and obtained expression with corresponding variable dropped is registered as the solution for that variable in the variable table H (step 565). This completes the second part of the operation of the Z solving unit 33.

For the problem B, these operations of the Z solving unit 33 up to this point make the variable table H and the unknown table Q as shown in FIGS. 29 and 30, respectively.

Following the completion of the operation by the solving unit 33, the checking unit 34 begins its operation, in accordance with a flow chart of FIG. 31.

First, at the step 601, an expression for each unknown is derived from the solutions registered in the variable table H, and registered as a solution for the unknown in the unknown table Q.

Figure 32:
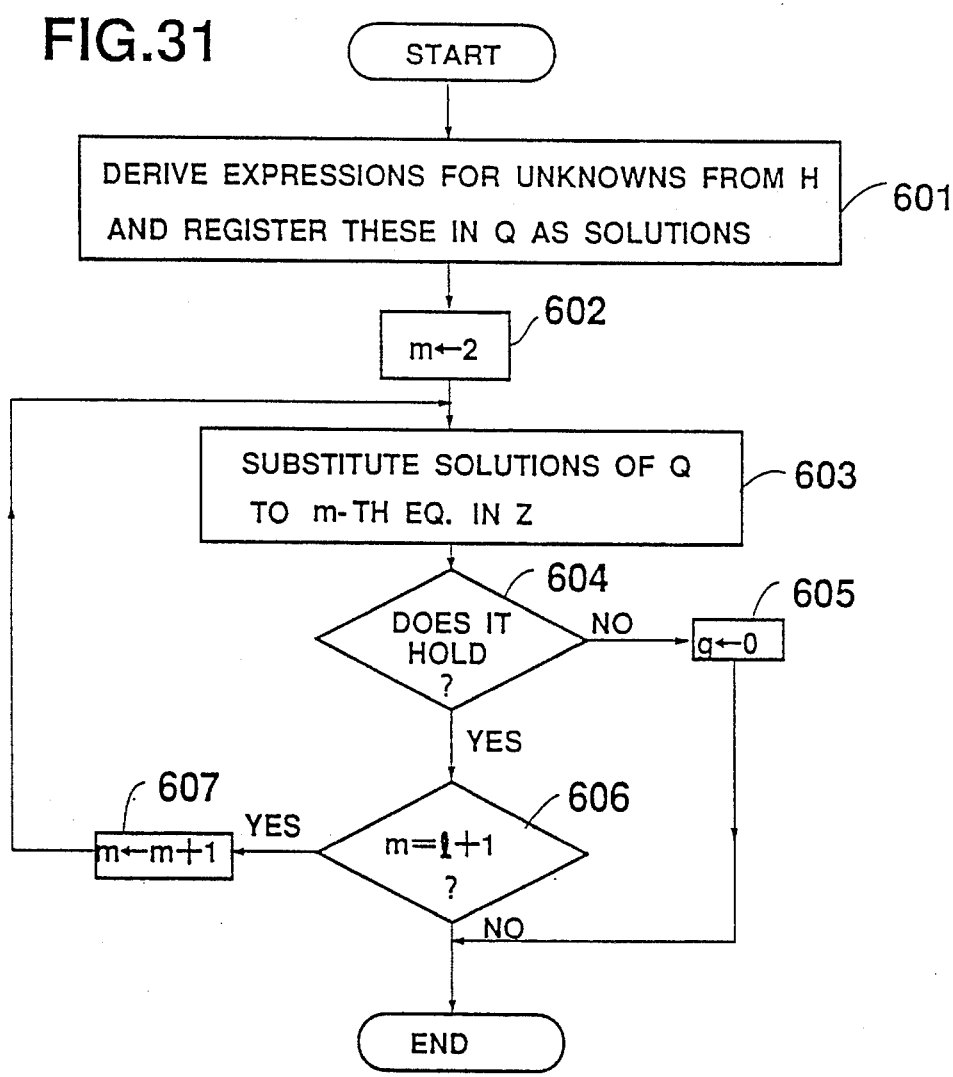
FIG. 32 is an illustration of the unknown table in the second embodiment, showing its intermediate state in a course of the operation by the analyzing means.

For the problem B, this operation of the checking unit 34 makes the unknown table Q as shown in FIG. 32.

Then, the following steps are carried out.

[k0] Set a counter m to 2 (step 602).

[k1] Substitute the solutions for the unknown from the unknown table Q into the m-th equation in the area Z (step 603) and check if it holds (step 604). If it does not hold, then set the solvability flag g to 0 and terminate (step 605).

[k2] If m=l+1, simply terminate (step 606), otherwise set the counter m to m+1 and go back to [k1] (step 607).

This completes the operation of the checking unit 34.

Lastly, the analyzing unit 30 determines the input data as satisfiable when the solvability flag g is 0, and unsatisfiable otherwise. On the basis of such determination of the satisfiability of the input data, the output is produced to indicate that the problem is provable if the input data are determined as unsatisfiable, or not so otherwise.

For the problem B, since the process terminates with the solvability flag g=1, the input data are determined as unsatisfiable, so that the problem is provable, in agreement with the earlier discussion of this problem.

It is to be pointed out that in this second embodiment, it is possible to have more than one candidate for the solutions in a course of analysis. In such a case, the analysis can be continued for one of the candidates while the others can temporarily be stored in the memory unit 35 along with the results of the completed steps and the solvability flag at the time of such storing, so that when that one candidate for which the analysis is continued turned out to be not yielding the desired non-negative solutions, then the analysis for one of the stored candidate can be resumed for the remaining steps, and so on. It is to be noted that if one such candidate is found to yield the desired non-negative solution, there is no need to carry out the analysis for the other candidates any further, since the existence of one such solution is sufficient. On the other hand, the analysis must be continued until all the candidates are found not to yield the desired non-negative solution.

It is also to be noted that this embodiment can be modified such that instead of providing the analyzing means 30 with its own memory unit 35, the operation of analysis is performed by the analyzing means 30 and the storing means 20 interactively.

10. EFFECT OF THE PRESENT INVENTION

The foregoing description of the present invention makes it clear that the use of the algebraic proving principle enables an apparatus for automated theorem proving according to the present invention to reach the final result in about the same amount of time for either a case of provable or that of not provable, so that it is highly efficient irrespective of a set of clause to be dealt with.

In addition, for the problems in the propositional logic, the problem reduces to that of simple algebraic equations on Z. It can be shown that in this case, the time required to solve the problem is about 2.81-th power of the magnitude of the problem. Furthermore, it is possible in this case to implement the method of the present invention such that the devoted vector processing using multiple pipelines can be employed, so that the very high speed apparatus can be realized.

As for the problems in the predicate logic of first order, the many specific methods for solving the proof equation are still in developing stage at the time of this application, except for one described above, but since the proof equation is given in terms of the modules and its ring of scalars, the subject which has been very actively studied in algebra, the significant progress in this direction is expected in near future. However, it is to be emphasized here that the essence of the present invention, i.e., the use of the algebraic proving principle, does not rely on the specific methods for solving the proof equations, for which any method known at a time can be employed with a suitable implementation.

11. APPLICATIONS OF AUTOMATED THEOREM PROVING

The automated theorem proving can be utilized in automatically determining answers to various types of decision problem on physical objects, so that it can successfully be applied in various fields such as those described in detail below.

In such an application of the automated theorem proving, the decision problem to be solved is expressed in terms of first level expressions which depend on the concrete details of the physical objects involved. For instance, in an application to a field of controlling a robot or a manufacturing plant, the problem is to determine the appropriate electric signals for activating various parts of the robot or the manufacturing plant, so that the decision problem is expressed in terms of desired relationships among the electric signals for various parts of the robot or the manufacturing plant. On the other hand, in an application to a field for supporting the human intellectual activity such as a database system for automatically searching out knowledges on chemical materials, the decision problem is expressed by questions and answers given in terms of letters and chemical symbols comprehensible to the human being.

As such, the first level expressions can vary from one field of application to another field of application, but the decision problem expressed in the first level expression can be inputted into an automated theorem proving system by being transformed into second level expressions given in terms of numerical values and symbols that can be handled by a computer, by using various transformation device such as a sensor, amplifier, and A/D converter, or various human/machine interface device such as a keyboard and mouse.

Similarly, the response outputs from the system which are also given in terms of the second level expressions in numerical values and symbols can be transformed back to the first level expressions by using various output devices such as a D/A converter, amplifier, display, and printer.

In general, to solve the decision problem formulated in the second level expressions is not so easy task. For this reason, in the automated theorem proving system according to the present invention, the decision problem given in the second level expressions is further transformed into a satisfiability problem for sets of clauses in the predicate logic of first order. Here, the sets of clauses so generated can be regarded as the third level expressions of the problem. Such third level expressions, i.e., the sets of clauses, can be handled in the systems as character code strings, of which the fixed portion may be given to the system in advance while the variable portion may be obtained by transforming the second level expressions.

Figure 33:
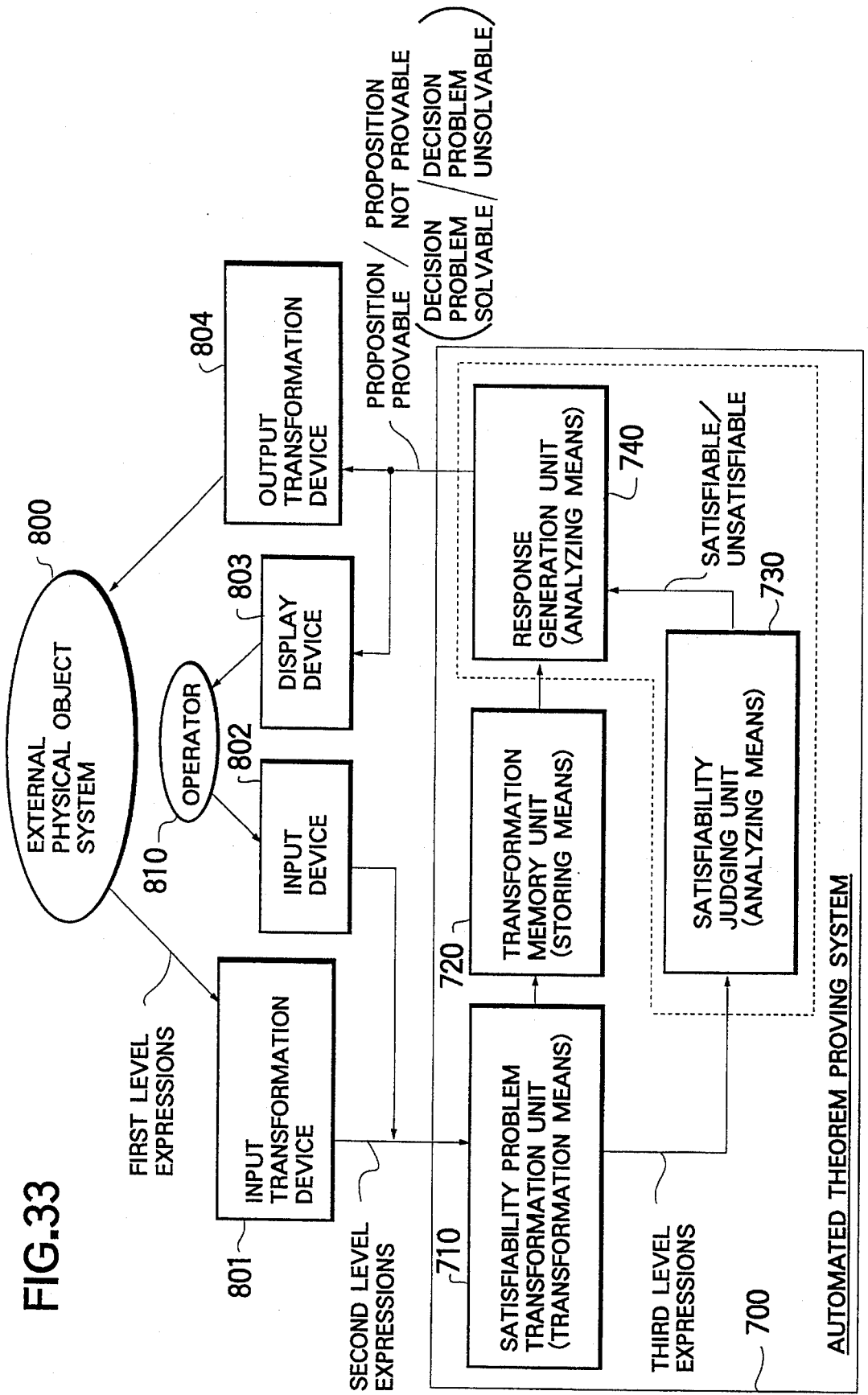
FIG. 33 is a schematic block diagram of a generic automated theorem proving system according to the present invention in a case of application.

Now, in general, the automated theorem proving system according to the present invention can be used in an application as shown in FIG. 33.

Namely, the decision problem concerning the external physical object system 800 is defined by the first level expressions from an external physical object system 800 and an inquiry entered by an operator 810 through the input unit 802. The input decision problem is transformed by an input transformation device 801 into the second level expressions, and then entered into the satisfiability problem transformation unit 710 of the automated theorem proving system 700.

Next, the decision problem is transformed into the satisfiability problem expressed in the third level expressions by the satisfiability problem transformation unit 710, and then entered into the satisfiability judging unit 730 in order to have a judgement as to the satisfiability of the sets of clauses corresponding to the decision problem. Meanwhile, the correspondences between the second level expressions and the third level expressions used by the satisfiability problem transformation unit 710 are memorized in the transformation memory unit 720.

Next, the satisfiability judging unit 730 indicates either one of satisfiable or unsatisfiable to the response generation unit 740, in response to which the response generation unit 740 generates an output indicating either the inquiry is provable or not provable, i.e., the decision problem is solvable or unsolvable, and transmits the output to the display device 803 by which the output is shown to the operator 801 and to the output transformation device 804 by which the output is transformed back into the first level expressions and fed back to the external physical system 800.

Figure 34:
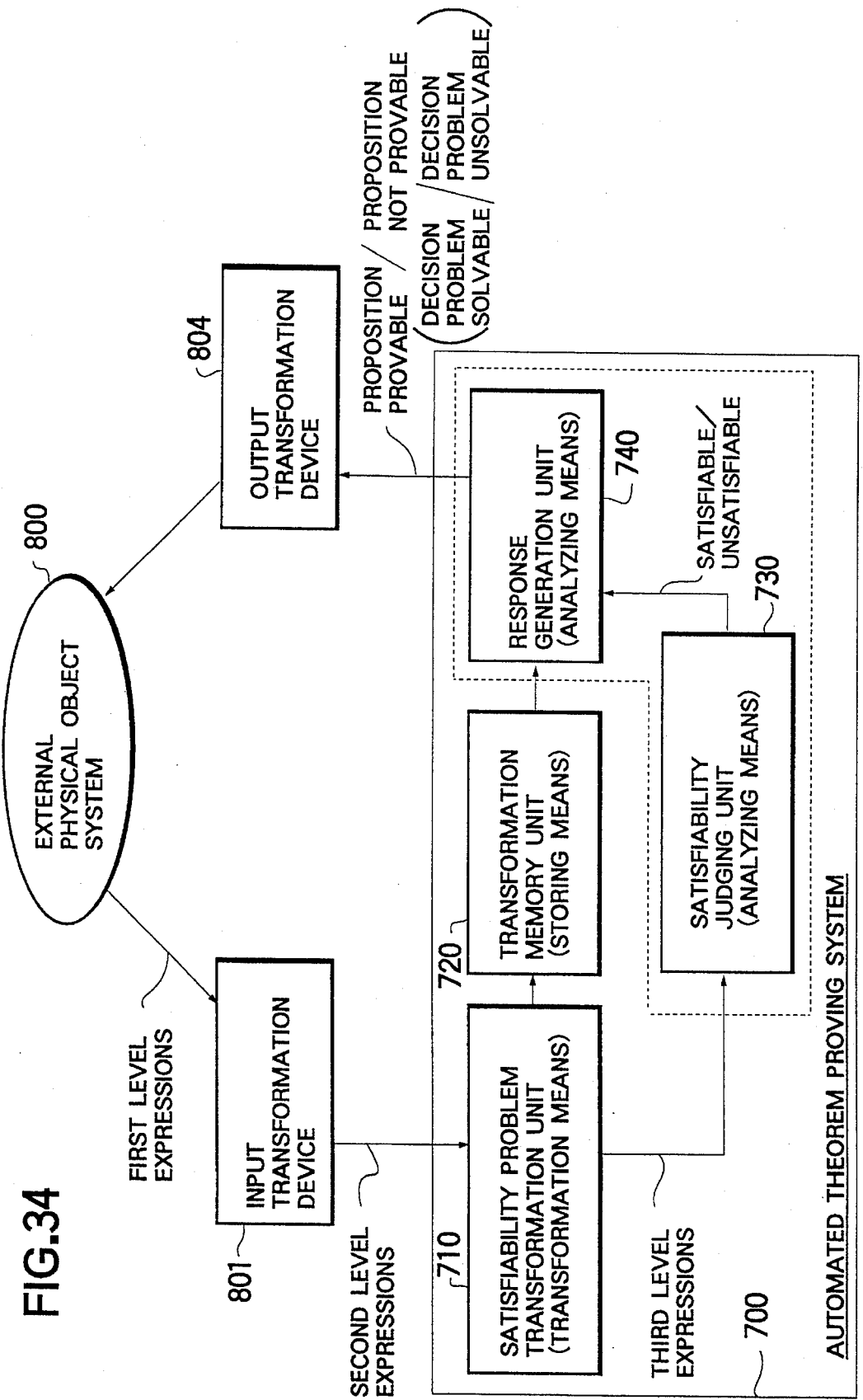
FIG. 34 is a schematic block diagram of another generic automated theorem proving system according to the present invention in a case of application.

Alternatively, the automated theorem proving system according to the present invention can be used in an application as shown in FIG. 34, where the input unit 802, the display device 803, and the operator 810 are excluded from the system of FIG. 33.

In this case. the decision problem concerning the external physical object system 800 is defined by the first level expressions from an external physical object system 800. The input decision problem is transformed by an input transformation device 801 into the second level expressions, and then entered into the satisfiability problem transformation unit 710 of the automated theorem proving system 700.

Next, the decision problem is transformed into the satisfiability problem expressed in the third level expressions by the satisfiability problem transformation unit 710, and then entered into the satisfiability judging unit 730 in order to have a judgement as to the satisfiability of the sets of clauses corresponding to the decision problem. Meanwhile, the correspondences between the second level expressions and the third level expressions used by the satisfiability problem transformation unit 710 are memorized in the transformation memory unit 720.

Next, the satisfiability judging unit 730 indicates either one of satisfiable or unsatisfiable to the response generation unit 740, in response to which the response generation unit 740 generates an output indicating either the decision problem is solvable or unsolvable, and transmits the output to the output transformation device 804 by which the output is transformed back into the first level expressions and fed back to the external physical system 800.

In the following, several practical situations in which the application of the automated theorem proving system of the present invention is particularly advantageous will be described.

(A) Database system

Throughout the history of mankind, a vast amount of knowledge and data have been compiled in numerous fields of intellectual activities, so that the task of searching out the desired knowledge or data is progressively becoming an enormously time consuming one. For this reason, there is a need to automate this task of searching. This Is already realized in a case the information can be expressed in terms of character string, because such an information can be stored in a large capacity memory in a database system, which can be carry out the searching task automatically by using computer.

In a simple database system, the searching task is accomplished by associating each knowledge or data entry with a short character series called a key word, where the searching is carried out by matching the key words. This is a suitable manner for the searching of the reference documents or information of indeterminate form, but is unable to achieve the searching that reflects the actual contents of the information.

In a more sophisticated database, the knowledges are expressed in appropriate knowledge expression forms so as to enable the searching that reflects the actual contents of the information, and stored in the database system in terms of appropriate internal expressions such that it becomes capable not only of providing the information stored as it is, but also of answering a question concerning the stored knowledges by utilizing a function of inference.

A particularly powerful knowledge expression forms in such a sophisticated database can be provided by the expressions in predicate logic of first order used in the automated theorem proving system of the present invention.

In the database utilizing the automated theorem proving system of the present invention with the predicate logic of first order, the information is expressed in terms of clauses. When a question is posed against the database, the clauses in the predicate logic of first order which negates the posed question is constructed, and whether the overall database with the constructed negating clauses is going to be satisfiable or not is judged. If it is judged as satisfiable, then the answer to the question is determined as "No", whereas if it is judged as unsatisfiable, then the answer to the question is determined as "Yes". Also, the values for the unknowns in the question can be determined from the values which make the overall database with the constructed negating clauses unsatisfiable.

In this manner, even when there is no direct answer to the posed question within the database, the appropriate answer may be obtained automatically by combining the knowledges in the database.

In this case, the satisfiability problem transformation unit provides the clauses in the predicate logic of first order which negates the question entered by the operator through the input unit. Here, unknowns are assigned to the questioning phrases such as "which", "who", "whom", "when", and "where", and this assignment is memorized in the assignment memory unit. Then, whether the overall database with the constructed negating clauses is going to be satisfiable or not is judged by the satisfiability judging unit. When it is judged as satisfiable, then the response generation unit outputs an answer "No". On the other hand, when it is judged as unsatisfiable, then the response generation unit receives the substitutions for the unknowns in judging the clauses to be unsatisfiable from the satisfiability judging unit, constructs an appropriate answer to the to the question by combining these substitutions and the information stored in the assignment memory unit, and outputs this result along with the answer "Yes".

Moreover, in such a database system, the stored data have to be updated routinely in order to keep up with the progress made in the relevant fields on intellectual activities. In such an updating operation, it is very crucial to assure that no contradiction arises by the addition of the updated knowledge to the original database.

In this case, if the knowledges are expressed in terms of the predicate logic of first order, whether there is a contradiction or not can be determined by judging whether the overall database after the updating is satisfiable or unsatisfiable. The contradiction does not arise if it is judged as satisfiable. On the other hand, the contradiction arises if it is judged as unsatisfiable, and the clauses used in obtaining this result are the source of the contradiction.

Thus, by applying the automated theorem proving system of the present invention with the predicate logic of first order, a highly sophisticated and reliable database system can be realized.

(B) Design verification

Various designing such as those of buildings, automobiles, airplanes, computers, and LSI must satisfy the numerous conditions due to the required functions, required performance, working environments, available technical level, physical laws, legislation, and regulations. For this reason, it is necessary to verify that all these conditions are actually satisfied by the completed design.

For example, in a case of designing a computer hardware, a control device of a CPU is generally designed as a sequential machine as a whole. A sequential machine is a machine having a finite number of internal states, which can determine a next internal state from a current internal state and externally provided input signals according to the predetermined transition rules.

In designing such a sequential machine, there may be a case in which an unnecessary internal state not needed for the required function is present, even if it is structurally possible. For instance, if four flip-flops are used for realizing a sequential machine for which only thirteen internal states are required, since four flip-flops can provide sixteen different states, three states would be unnecessary.

In such a case, it is necessary to verify whether the transition rules are appropriately designed to avoid such unnecessary states or not. In this verification, the automated theorem proving of the present invention with the predicate logic of first order can be utilized as follows. Namely, the descriptions in the predicate logic of first order are prepared for the transition rules, possible external input signal patterns, an assertion that "the machine is in its initial state at the beginning", and the negation of an assertion that "the machine is not in the unnecessary states at any moment", and then the satisfiability of these descriptions as a whole is judged. If it is judged as unsatisfiable, the design is acceptable. On the other hand, if it is judged as satisfiable, it can be determined that there is an error in the design.

Thus, by applying the automated theorem proving system of the present invention with the predicate logic of first order, a highly reliable design verification system can be realized.

(C) Scheduling

Here, a problem of obtaining an appropriate procedure for a manufacturing machine to assemble a certain product is considered. In the initial state, all the unassembled parts are present, while in the final state, the product must be obtained by assembling the parts as designed. There are many possible intermediate states between the initial state and the final state according to various possible manners of connecting various parts. Also, each manufacturing machine has a limited repertoire of assembling operations. The problem is to obtain a series of operations for reaching from the initial state to the final state.

In this problem, the automated theorem proving of the present invention with the predicate logic of first order can be utilized as follows.

Namely, the intermediate states and the possible assembling operations of the manufacturing machine must be expressed in terms of the predicate logic of first order. To this end, the parts are named distinctively, and the predicate for expressing the possible manners of connecting various parts are determined. Also, the possible assembling operations are named distinctively, and the predicate for expressing the state transition resulting by each assembling operation, i.e., a change in the manner of connecting various parts, are determined. Then, function symbols for expressing sequences of assembling operations, i.e., procedures, are determined. Also, the predicate is determined for expressing a situation that a certain state results by executing a certain procedure in previous state. Then, the description in the predicate logic of first order are prepared for assertions "the operation p is executable in the state a", "when the operation p is executable in the state a, if the operation is executed, the state b is resulting". and "by a procedure X, the final state is never attained from the initial state", and the satisfiability of these descriptions as a whole is judged. If it is judged as satisfiable, then this product cannot be assembled by this manufacturing machine. On the other hand, if it is judged as unsatisfiable, it can be determined that there is a successful procedure for assembling this product by this manufacturing machine, and a procedure substituted for X in obtaining this result is the successful procedure.

Thus, by applying the automated theorem proving system of the present invention with the predicate logic of first order, a highly reliable scheduling system can be realized.

(D) Robot controlling

One of the major problem in controlling the robot is to determine the procedure for achieving a desired result. This problem is the same problem as the scheduling problem described above in (C), so that this type of robot controlling can also be realized by utilizing the automated theorem proving system of the present invention with the predicate logic of first order, just as in the scheduling problem described above.

(E) Job shop problem

Here, the following problem is considered. In a factory manufacturing several products, there are $n_i$ types of manufacturing machines, one for each type $a_i$. Now, in order to manufacture a product $S_j$, it is necessary to occupy each of these manufacturing machines for a predetermined period of time in a predetermined order, and all the manufacturing operations for all the products must be completed within a predetermined factory operation period $T_e$. The problem is to determine the appropriate procedure for manufacturing, which is a kind of a job shop problem.

In this problem, the automated theorem proving of the present invention with the predicate logic of first order can be utilized as follows. Here, the negation of a clause is expressed by a symbol "~" in front of the clause symbol, and a logical sum of literals is expressed by a symbol "$\vee$".

First, a time unit u which is appropriate in considering both the manufacturing time for each product and the remaining factory operation period is determined, to be 15 minutes for instance. Then, putting the starting time as s, a time s+t is expressed by a term:

$$c(c(c( \ldots c(s) \ldots )))$$

which has t/u fold nestings of a function c. Next, a predicate for expressing that "the manufacturing machine ai is occupied for processing the product $S_j$ from time $T_1$ to time $T_2$" is determined as $P(T_1, a_i, S_j, T_2)$. Here, for the sake of simplicity, it is assumed that in processing each product each manufacturing machine is used at most once.

Then, using these notations, the manufacturing machine occupation order and the manufacturing machine occupation period for each product are described as follows. Namely, for each processing step of each product and for each manufacturing machine, the clause for expressing that "if the manufacturing machine $a_i$ is occupied for processing the product $S_j$ from time $T_1$ to time $T_2$, then $T_1+t_{aj}=T_2$, and if it is not the first processing step, then the processing by the manufacturing machine aip must be completed before time $T_{p2} < T_1$," is determined as:

first processing step:

$$P(T_1, a_{i1}, S_j, T_2) \vee \sim A(T_1, t_{aj}, T_2).$$

subsequent manufacturing steps:

$$P(T_1, a_{in}, S_j, T_2) \vee \sim A(T_1, t_{aj}, T_2) \vee \sim P(T_{p1}, a_{ip}, S_j, T_{p2}) \vee \sim G(T_1, T_{p2}).$$

where $G(T_1, T_2)$ is a predicate for expressing that "$T_1$ is greater than $T_2$", and $A(T_1, T_2, T_3)$ is a predicate for expressing that "$T_1+T_2=T_3$", where the relations with these meanings are also given as clauses.

Also, with a predicate $E(T_e)$ for expressing that "all the manufacturing steps are finished by time $T_e$", these relations are described as clauses:

$$E(T_e) \lor \sim P(T_{11}, a_{1e}, S_1, T_{12}) \lor \sim G(T_e, T_{12}) \lor$$
$$\sim P(T_{21}, a_{2e}, S_2, T_{22}) \lor \sim G(T_e, T_{22}) \lor$$
$$\overline{\phantom{xxxxx}}$$
$$\sim P(T_{m1}, a_{me}, S_m, T_{m2}) \lor \sim G(T_e, T_{m2}).$$

where $a_{ie}$ is the last manufacturing machine used in manufacturing the product $S_i$.

Also, the clause for expressing the mutual exclusiveness in occupying the manufacturing machines can be given by:

$$G(T_{a1}, T_{b2}) \lor G(T_{b1}, T_{a2}) \lor \sim P(T_{a1}, a, S_1, T_{a2}) \lor \sim P(T_{b1}, a, S_2, T_{b2})$$
$$\lor \sim NE(S_1, S_2).$$

where $NE(S_1, S_2)$ is a predicate for expressing that "$S_1$ and $S_2$ are different", where the relation with this meaning is also given by a clause.

Also, a clause for expressing the negation of the assertion that "all the manufacturing steps are finished by the period $t_3$" can be given by:

$$\sim E(t_e).$$

Then, the satisfiability of a set of all these clauses as a whole is judged. If it is judged as satisfiable, then there is no solution to the problem. On the other hand, if it is judged as unsatisfiable, it can be determined that there is a successful procedure for solving the problem which can be determined from the time substituted into a time variable in each clause for each manufacturing step of each product and for each manufacturing machine in obtaining this result.

Thus, by applying the automated theorem proving system of the present invention with the predicate logic of first order, a highly reliable job shop problem solving system can be realized.

It is to be noted that besides those modifications and applications already mentioned above, many modifications and variations of the embodiments described above may be made without departing from the novel and advantageous features of the present invention. Accordingly, all such modifications and variations are intended to be included within the scope of the appended claims.

What is claimed is:

1. A method of operating a database system using a solution to a decision problem which is obtained by determining provability of a proposition given in the form of a question concerning relationships among data in the database system on a basis of a given set of knowledge concerning relationships among the data in the database system, the method comprising the steps of:

(a) transforming sets of clauses representing the decision problem defined in terms of a negation of the proposition and the given set of knowledge into expressions in terms of elements of a module;

(b) constructing a linear equation with the elements of the module as coefficients and elements of a ring of scalars of the module as unknowns;

(c) checking the existence of a non-negative solution to the linear equation;

(d) judging that the set of clauses is unsatisfiable when the non-negative solution exists, and satisfiable otherwise;

(e) regarding the decision problem as provable when the set of clauses is judged as unsatisfiable at the step (d), and as not provable otherwise;

(f) rejecting the proposition when the decision problem is regarded as not provable at the step (e), and otherwise determining the solution of the decision problem from values of the unknowns in the linear equation by which the non-negative solution for the linear equation is obtainable; and (g) operating the database system to provide an answer to the question according to the solution of the decision problem determined from the step (f).

2. The method of claim 1, wherein the elements of the module are ordered pairs of an integer and a collection of literals.

3. The method of claim 2, wherein each collection of literals contains all the literals appearing in each clause belonging to the sets of clauses for the proposition and the set of knowledge, with repeated occurrences of same literal allowed.

4. The method of claim 3, wherein the proposition and the set of knowledge are given in a language of the predicate logic of first order, and the elements of the ring of scalars comprises:

(1) 0 (zero element)

(2) 1 (unit element)

(3) substitutions of variables for predicates (4) properly defined products of (1), (2), and (3)

(5) properly defined additions of (1), (2), and (3).

5. The method of claim 4, wherein the linear equation is in a form:

$$\sum_{i=1}^{n} (1, x_i) \cdot \alpha_i = (1, \phi)$$

where (,) denotes an ordered pair of an integer and a collection of literals giving an element of the module, $x_i$ are collections of literals, $\phi$ is a collection of no literal, $\alpha_i$ are elements of the ring of scalars of the module, and $\cdot$ denotes a suitably defined operation of the elements of the ring of scalars of the module on the elements of the module.

6. The method of claim 1, wherein the step (c) includes the steps of:

(g) expressing the linear equation as a system of simultaneous equations; and (h) checking the existence of non-negative solutions to the system of simultaneous equations.

7. The method of claim 6, wherein the proposition and the set of knowledge are given in a language of the predicate logic of first order, and wherein the step (h) includes the steps of:

(h1) transforming the system of simultaneous equations into a transformed system of simultaneous equations which is homomorphic to the system of simultaneous equations;

(h2) checking the existence of non-negative solutions to the transformed system of simultaneous equations; and (h3) determining the existence of non-negative solutions to the system of simultaneous equations on a basis of a result of checking at the step (h2).

8. The method of claim 7, wherein the step (h1) utilizes a mapping $\mu$ from the ring to integers defined as follows:

$$\mu(0) = 0$$

$$\mu(1) = 1$$

$$\mu(\sigma) = 1$$

$$\mu(\alpha \cdot \beta) = \mu(\alpha) \cdot \mu(\beta)$$

$$\mu(\alpha + \beta) = \mu(\alpha) + \mu(\beta)$$

$\mu(-\alpha) = -\mu(\alpha)$ where σ is a substitution, · denotes the product of the ring, + denotes the addition of the ring, and −α is an additive inverse of an element α of the ring.

9. The method of claim 7, wherein the step (h1) utilizes a transformation in which each predicate symbol is distributed to each one of its arguments, and each function symbol is distributed to each one of its arguments.

10. The method of claim 7, wherein the step (h2) utilizes variables adjusting correspondences between terms in the system of simultaneous equations and the transformed system of simultaneous equations.

11. An apparatus for operating a database system using a solution to a decision problem which is obtained by determining provability of a proposition given in a form of a question concerning relationships among data in the database system on a basis of a given set of knowledge concerning relationships among the data in the database system, the apparatus comprising:

(a) means for transforming sets of clauses representing the decision problem defined in terms of a negation of the proposition and the given set of knowledge into expressions in terms of elements of a module;

(b) means for constructing a linear equation with the elements of the module as coefficients and elements of a ring of scalars of the module as unknowns;

(c) means for checking the existence of a non-negative solution to the linear equation;

(d) means for indicating with a flag the decision problem as provable when a non-negative solution exists, and is not provable otherwise;

(e) means for rejecting the proposition when the flag indicates the decision problem as not provable;

(f) means for determining the solution of the decision problem from values of the unknowns in the linear equation by which the non-negative solution for the linear equation is obtainable when the flag indicates the decision problem as provable; and (g) means for operating the database system to provide an answer to the question according to the solution of the decision problem determined by the determining means.

12. The apparatus of claim 11, wherein the elements of the module are ordered pairs of an integer and a collection of literals.

13. The apparatus of claim 12, wherein each collection of literals contains all the literals appearing in each clause belonging to the sets of clauses for the proposition and the set of knowledge, with repeated occurrences of same literal allowed.

14. The apparatus of claim 13, wherein the proposition and the set of knowledge are given in a language of the predicate logic of first order, and the elements of the ring of scalars comprises:

(1) 0 (zero element)

(2) 1 (unit element)

(3) substitutions of variables for predicates (4) properly defined products of (1), (2), and (3)

(5) properly defined additions of (1), (2), and (3).

15. The apparatus of claim 14, wherein the linear equation is in a form:

$$\sum_{i=1}^{n} (1, x_i) \cdot \alpha_i = (1, \phi)$$

where (,) denotes an ordered pair of an integer and a collection of literals giving an element of the module, $x_i$ are collections of literals, ø is a collection of no literal, $\alpha_i$ are elements of the ring of scalars of the module, and · denotes a suitably defined operation of the elements of the ring of scalars of the module on the elements of the module.

16. The apparatus of claim 11, wherein (c) includes:

(g) means for expressing the linear equation as a system of simultaneous equations; and (h) means for checking the existence of non-negative solutions to the system of simultaneous equations.

17. The apparatus of claim 16, wherein the proposition and the set of knowledge are given in a language of the predicate logic of first order, and wherein (h) includes:

(h1) means for transforming the system of simultaneous equations into a transformed system of simultaneous equations which is homomorphic to the system of simultaneous equations;

(h2) means for checking the existence of non-negative solutions to the transformed system of simultaneous equations; and (h3) means for determining the existence of non-negative solutions to the system of simultaneous equations on a basis of a result of checking by (h2).

18. The apparatus of claim 17, wherein (h1) utilizes a mapping μ from the ring to integers defined as follows:

$\mu(0)=0$ $\mu(1)=1$ $\mu(\sigma)=1$ $\mu(\alpha \cdot \beta)=\mu(\alpha) \cdot \mu(\beta)$ $\mu(\alpha+\beta)=\mu(\alpha)+\mu(\beta)$ $\mu(-\alpha)=-\mu(\alpha)$ where σ is a substitution, · denotes the product of the ring, + denotes the addition of the ring, and −α is an additive inverse of an element α of the ring.

19. The apparatus of claim 17, wherein (h1) utilizes a transformation in which each predicate symbol is distributed to each one of its arguments, and each function symbol is distributed to each one of its arguments.

20. The apparatus of claim 17, wherein (h2) utilizes variables adjusting correspondences between terms in the system of simultaneous equations and the transformed system of simultaneous equations.

21. A method of operating a database system using a solution to a decision problem which is obtained by determining provability of a proposition given in the form of new data for updating the database system on a basis of a given set of knowledge concerning relationships among data in the database system, the method comprising the steps of:

(a) transforming sets of clauses representing updated data in the database system resulting from an introduction of the new data into the database system into expressions in terms of elements of a module;

(b) constructing a linear equation with the elements of the module as coefficients and elements of a ring of scalars of the module as unknowns;

(c) checking the existence of a non-negative solution to the linear equation;

(d) judging that the set of clauses is unsatisfiable when the non-negative solution exists, and satisfiable otherwise;

(e) regarding the new data as acceptable when the set of clauses is judged as satisfiable at the step (d), and otherwise as not acceptable;

(f) rejecting the new data and determining a source of contradiction from values of the unknowns in the linear equation by which the non-negative solution for the linear equation is obtainable when the new data is regarded as not acceptable at the step (e); and (g) updating the database system by the new data when the new data is regarded as acceptable at the step (e).

22. An apparatus for operating a database system by solving a decision problem for determining the provability of a proposition given in a form of a new data for updating database system on a basis of a given set of knowledge of data in the database system, the apparatus comprising:

(a) means for transforming steps of clauses representing updated data in the database system resulting by introducing the new data into the data in the database system into expressions in terms of elements of a module;

(b) means for constructing a linear equation with the elements of the module as coefficients and elements of a ring of scalars of the module as unknowns;

(c) means for checking the existence of a non-negative solution to the linear equation;

(d) means for indicating with a flag the new data as not acceptable when the non-negative solution exists, and is acceptable otherwise;

(e) means for rejecting the new data and determining a source of contradiction from values of the unknowns in the linear equation by which the non-negative solution for the linear equation is obtainable when the flag indicates the new data as not acceptable; and (f) means for updating the database system by the new data when the flag indicates the new data as acceptable.

23. A method of verifying consistency of a design/program by using a solution to a decision problem which is obtained by determining provability of a proposition concerning operational relationships required in the design/program on a basis of a given set of knowledge of the design/program, the method comprising the steps of:

(a) transforming sets of clauses representing the decision problem defined in terms of the proposition and the given set of knowledge into expressions in terms of elements of a module;

(b) constructing a linear equation with the elements of the module as coefficients and the elements of a ring of scalars of the module as unknowns;

(c) checking the existence of a non-negative solution to the linear equation;

(d) judging that the set of clauses is unsatisfiable when the non-negative solution exists, and satisfiable otherwise;

(e) regarding the design/program as acceptable when the set of clauses is judged as satisfiable at the step (d), and as not acceptable otherwise;

(f) rejecting the proposition and determining a source of inconsistency of the design/program from values of the unknowns in the linear equation by which the non-negative solution for the linear equation is obtainable when the design/program is regarded as not acceptable at the step (e); and (g) verifying the design/program as acceptable when the design/program is regarded as acceptable at the step (e).

24. An apparatus for verifying the consistency of a design/program by solving a decision problem for determining the provability of a proposition concerning operational relationships required in the design/program on a basis of a given set of knowledge of the design/program, the apparatus comprising:

(a) means for transforming sets of clauses representing the decision problem defined in terms of the proposition and the set of knowledge into expressions in terms of elements of a module;

(b) means for constructing a linear equation with the elements of the module as coefficients and elements of a ring of scalars of the module as unknowns;

(c) means for checking the existence of a non-negative solution to the linear equation;

(d) means for indicating with a flag the design/program as not acceptable when a non-negative solution exists, and as acceptable otherwise;

(e) means for rejecting the proposition and determining a source of inconsistency of the design/program from values of the unknowns in the linear equation by which the non-negative solution for the linear equation is obtainable when the flag indicates the design/program as not acceptable; and (f) means for verifying the design/program as acceptable when the flag indicates the design/program as acceptable.

25. A method of operating a physical machine system using a solution to a decision problem which is obtained by determining provability of a proposition concerning a procedure for operating the physical machine system on a basis of a given set of knowledge of the physical machine system, the method comprising the steps of:

(a) transforming sets of clauses representing the decision problem defined in terms of a negation of the proposition and the given set of knowledge into expressions in terms of elements of a module;

(b) constructing a linear equation with the elements of the module as coefficients and the elements of a ring of scalars of the module as unknowns;

(c) checking the existence of a non-negative solution to the linear equation;

(d) judging that the set of clauses is unsatisfiable when a non-negative solution exists, and satisfiable otherwise;

(e) regarding the proposition as acceptable when the set of clauses is judged as unsatisfiable at the step (d), and as not acceptable otherwise;

(f) rejecting the proposition when the proposition is regarded as not acceptable at the step (e);

(g) determining an appropriate procedure from values of the unknowns in the linear equation by which the non-negative solution for the linear equation is obtainable; and (h) operating the physical machine system according to the determined appropriate procedure when the proposition is regarded as acceptable at the step (e).

26. An apparatus for operating a physical machine system using a solution to a decision problem which is obtained by determining provability of a proposition concerning a procedure for operating the physical machine system on a basis of a given set of knowledge of the physical machine system, the apparatus comprising:

(a) means for transforming sets of clauses representing the decision problem defined in terms of a negation of the proposition and the given set of knowledge into expressions in terms of elements of a module;

(b) means for constructing a linear equation with the elements of the module as coefficients and elements of a ring of scalars of the module as unknowns;

(c) means for checking the existence of a non-negative solution for the linear equation;

(d) means for indicating with a flag that the proposition is acceptable when a non-negative solution exists, and is not acceptable otherwise;

(e) means for rejecting the proposition when the flag indicates the proposition as being not acceptable;

(f) means for determining an appropriate procedure from values of the unknowns in the linear equation by which the non-negative solution for the linear equation is obtainable; and (g) means for operating the physical machine system according to the appropriate procedure determined by the determining means when the flag indicates the proposition as being acceptable.

27. A computer-implemented method of resolving a decision problem and then carrying out a solution thereof by judging provability of a proposition concerning relationships among physical objects on a basis of a given set of knowledge about the relationships among physical objects, the method comprising the steps of:

(a) transforming sets of clauses representing the decision problem defined in terms of a negation of the proposition and the given set of knowledge into expressions in terms of elements of a module;

(b) constructing a linear equation with the elements of the module as coefficients and elements of a ring of scalars of the module as unknowns;

(c) checking for an existence of a non-negative solution to the linear equation;

(d) determining the set of clauses as being unsatisfiable when the non-negative solution exists, and as being satisfiable otherwise;

(e) judging the decision problem as provable when the set of clauses is determined as unsatisfiable at the step (d), and as unprovable otherwise;

(f) rejecting the proposition when the decision problem is judged as unprovable at the step (e), and otherwise determining a solution of the decision problem from values of the unknowns in the linear equation; and (g) carrying out the solution of the decision problem obtained in the step (f).

* * * * *